US012763831B2

(12) United States Patent
Wang et al.

(10) Patent No.: US 12,763,831 B2
(45) Date of Patent: Oct. 13, 2026

(54) METHOD FOR OBTAINING CHANNEL INFORMATION AND COMMUNICATIONS APPARATUS

(71) Applicant: HUAWEI TECHNOLOGIES CO., LTD., Shenzhen (CN)

(72) Inventors: Jian Wang, Hangzhou (CN); Yourui Huangfu, Hangzhou (CN); Chen Xu, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 532 days.

(21) Appl. No.: 18/074,237

(22) Filed: Dec. 2, 2022

(65) Prior Publication Data

US 2023/0109063 A1 Apr. 6, 2023

Related U.S. Application Data

(63) Continuation of application No. PCT/CN2021/095488, filed on May 24, 2021.

(30) Foreign Application Priority Data

Jun. 3, 2020 (CN) ......................... 202010493592.0

(51) Int. Cl.

| | |
|---|---|
| ***H04B 7/06*** | (2006.01) |
| ***H04L 5/00*** | (2006.01) |
| ***H04L 41/16*** | (2022.01) |

(52) U.S. Cl.

CPC ......... *H04B 7/0626* (2013.01); *H04B 7/0658* (2013.01); *H04L 5/0048* (2013.01); *H04L 41/16* (2013.01)

(58) Field of Classification Search

None

See application file for complete search history.

(56) References Cited

U.S. PATENT DOCUMENTS

| | | | | |
|---|---|---|---|---|
| 2019/0059092 | A1 * | 2/2019 | Fitch | H04L 25/0202 |
| 2019/0140801 | A1 * | 5/2019 | Ko | H04B 7/04 |
| 2020/0106498 | A1 * | 4/2020 | Zhou | H04B 7/06968 |

(Continued)

FOREIGN PATENT DOCUMENTS

| | | |
|---|---|---|
| CN | 105519181 A | 4/2016 |
| CN | 110061946 A | 7/2019 |

*Primary Examiner* — Gregory B Sefcheck
*Assistant Examiner* — Benjamin Peter Welte
(74) *Attorney, Agent, or Firm* — Leydig, Voit & Mayer, Ltd.

(57) ABSTRACT

This application provides a method for obtaining channel information and a communications apparatus. The method includes: A first device sends a first reference signal to a second device, where density of the first reference signal is less than or equal to density of a second reference signal, and the second reference signal is a normal-density reference signal; the first device receives first channel state information CSI from the second device; and the first device obtains second CSI based on the first CSI and a first neural network model, where the second CSI is used to indicate channel information between the first device and the second device. The first neural network model is deployed on a side of the first device, to reduce transmission overheads of the first device and/or feedback overheads of the second device.

18 Claims, 12 Drawing Sheets

(56) References Cited

U.S. PATENT DOCUMENTS

| | | | | |
|---|---|---|---|---|
| 2021/0105111 | A1* | 4/2021 | Yoon | H04L 5/0048 |
| 2021/0351885 | A1* | 11/2021 | Chavva | H04B 7/0626 |
| 2021/0376895 | A1* | 12/2021 | Xue | H04B 7/0626 |
| 2023/0209368 | A1* | 6/2023 | Lee | H04B 7/06958<br>370/252 |

* cited by examiner

METHOD FOR OBTAINING CHANNEL INFORMATION AND COMMUNICATIONS APPARATUS

CROSS-REFERENCE TO RELATED APPLICATIONS

This application is a continuation of International Application No. PCT/CN2021/095488, filed on May 24, 2021, which claims priority to Chinese Patent Application No. 202010493592.0, filed on Jun. 3, 2020. The disclosures of the aforementioned applications are hereby incorporated by reference in their entireties.

TECHNICAL FIELD

This application relates to the communications field, and more specifically, to a method for obtaining channel information and a communications apparatus.

BACKGROUND

In a massive multiple-input multiple-output (massive multiple-input multiple-output, Massive MIMO) technology, a network device may reduce interference between a plurality of terminal devices and interference between a plurality of signal streams of a same terminal device by using a precoding technology, to improve signal quality, implement spatial multiplexing, and improve spectrum utilization.

For example, the terminal device may determine, through channel measurement or the like, a precoding matrix that matches a downlink channel, and expect to enable, through feedback, the network device to obtain a precoding matrix that is the same as or similar to a precoding vector determined by the terminal device. Alternatively, for example, the network device may determine, through channel measurement or the like, a precoding matrix that matches an uplink channel, and expect to enable, through feedback, the terminal device to obtain a precoding matrix that is the same as or similar to a precoding vector determined by the network device.

Usually, in a wireless communications system, channel estimation is performed by placing a reference signal known to both a transmit end and a receive end on a radio transmission resource. However, to obtain accurate channel information, the transmit end needs to occupy a relatively large resource to transmit the reference signal. Therefore, there are relatively high transmission overheads. On this basis, there are also relatively high feedback overheads at the receive end.

SUMMARY

This application provides a method for obtaining channel information, to reduce overheads of sending a reference signal by a transmit end and/or reduce feedback overheads of a receive end.

According to a first aspect, a method for obtaining channel information is provided. The method may include: A first device sends a first reference signal to a second device, where density of the first reference signal is less than or equal to density of a second reference signal, and the second reference signal is a normal-density reference signal; the first device receives first channel state information (channel state information, CSI) from the second device, where when the density of the first reference signal is less than the density of the second reference signal, the first CSI is obtained by the second device based on the first reference signal, or when the density of the first reference signal is equal to the density of the second reference signal, the first CSI is obtained by the second device based on a part of the first reference signal; and the first device obtains second CSI based on the first CSI and a first neural network model, where the second CSI is used to indicate channel information between the first device and the second device.

It should be noted that normal density is density of a reference signal defined in a current protocol. The density of the reference signal refers to a percentage of a quantity of resources used to transmit the reference signal in a total quantity of transmission resources. For example, as defined in a current new radio (new radio, NR) protocol, a percentage of a quantity of resources used to transmit a 32-port channel state information reference signal (channel state information reference signal, CSI-RS) in a total quantity of transmission resources is approximately 20%. Therefore, it may be considered that normal density of the 32-port CSI-RS is 20%.

Based on the technical solution, the first neural network model is deployed on a side of the first device, so that the first device may restore all channel information (the second CSI) based on some channel information (the first CSI) and the first neural network model. Therefore, when the first neural network model is deployed on the side of the first device, the second device may feed back only the some channel information (the first CSI) to the first device, to reduce feedback overheads of the second device.

In addition, when the first neural network model is deployed on the first device, the first device may send a low-density reference signal to the second device, to reduce overheads of sending a reference signal by the second device.

Optionally, when the density of the first reference signal is less than the density of the second reference signal, the density of the first reference signal may be ½ or ¼ of the density of the second reference signal.

Optionally, when the first device is a network device, and the second device is a terminal device, the second reference signal and the first reference signal may be CSI-RSs or demodulation reference signals (demodulation reference signal, DMRS).

Optionally, when the first device is a terminal device, and the second device is a network device, the second reference signal and the first reference signal may be sounding reference signals (sounding reference signal, SRS) or DMRSs.

With reference to the first aspect, in some implementations of the first aspect, before the first device sends the first reference signal to the second device, the method further includes: The first device determines the first neural network model.

In an implementation, that the first device determines the first neural network model may specifically include: The first device sends the second reference signal to the second device; the first device receives third CSI from the second device, where the third CSI is obtained by the second device based on the second reference signal; and the first device trains a neural network based on the third CSI, to obtain the first neural network model.

With reference to the first aspect, in some implementations of the first aspect, the method further includes: The first device updates the first neural network model when a preset trigger condition is met.

In an implementation, that the first device updates the first neural network model may specifically include: The first device sends a third reference signal to the second device, where the third reference signal is a normal-density reference signal; the first device receives fourth CSI from the second device, where the fourth CSI is obtained by the second device based on the third reference signal; and the first device trains the neural network based on the fourth CSI, to obtain an updated first neural network model.

Optionally, the preset trigger condition may be that a first timer expires, and the first timer is started when the first device sends the first reference signal to the second device.

Optionally, the preset trigger condition may be that the first device determines that demodulation performance of demodulating first data by the second device is less than a preset threshold, and the first data is sent by the first device based on the second CSI.

Optionally, the preset trigger condition may be that the first device receives a first request message from the second device, and the first request message is used to request to update the first neural network model.

With reference to the first aspect, in some implementations of the first aspect, before the first device sends the first reference signal to the second device, the method further includes: The first device receives a second request message from the second device, where the second request message is used to request the first reference signal, and the second request message is further used to indicate the density of the first reference signal.

Optionally, when the first device is a network device, the second request message may be carried in uplink control information (uplink control information, UCI).

Optionally, when the first device is a terminal device, the second request message may be carried in downlink control information (downlink control information, DCI).

With reference to the first aspect, in some implementations of the first aspect, before the first device sends the first reference signal to the second device, the method further includes: The first device sends first indication information to the second device when determining the first neural network training model, where the first indication information is used to indicate the density of the first reference signal.

Optionally, when the first device is a network device, the first indication information may be carried in DCI.

Optionally, when the first device is a terminal device, the first indication information may be carried in UCI.

With reference to the first aspect, in some implementations of the first aspect, when the first device is a network device, the method further includes: The first device sends a radio resource control (radio resource control, RRC) message to the second device, where the RRC message includes density configuration information of the first reference signal.

With reference to the first aspect, in some implementations of the first aspect, when the first device is a terminal device, the method further includes: The first device receives an RRC message from the second device, where the RRC message includes density configuration information of the first reference signal.

According to a second aspect, a method for obtaining channel information is provided. The method may include: A second device receives a first reference signal from a first device, where density of the first reference signal is less than or equal to density of a second reference signal, and the second reference signal is a normal-density reference signal; and the second device sends first CSI to the first device, where the first CSI is used to obtain second CSI by using a first neural network model, the second CSI is used to indicate channel information between the first device and the second device, and when the density of the first reference signal is less than the density of the second reference signal, the first CSI is obtained by the second device based on the first reference signal, or when the density of the first reference signal is equal to the density of the second reference signal, the first CSI is obtained by the second device based on a part of the first reference signal.

It should be noted that normal density is density of a reference signal defined in a current protocol. The density of the reference signal refers to a percentage of a quantity of resources used to transmit the reference signal in a total quantity of transmission resources. For example, as defined in a current protocol, a percentage of a quantity of resources used to transmit a 32-port CSI-RS in a total quantity of transmission resources is approximately 20%. Therefore, it may be considered that normal density of the 32-port CSI-RS is 20%.

Based on the technical solution, the first neural network model is deployed on a side of the first device, so that the first device may restore all channel information (the second CSI) based on some channel information (the first CSI) and the first neural network model. Therefore, when the first neural network model is deployed on the first device, the second device may feed back only the some channel information (the first CSI) to the first device, to reduce feedback overheads of the second device.

In addition, when the first neural network model is deployed on the first device, the first device may send a low-density reference signal to the second device, to reduce overheads of sending a reference signal by the second device.

Optionally, when the density of the first reference signal is less than the density of the second reference signal, the density of the first reference signal may be ½ or ¼ of the density of the second reference signal.

Optionally, when the first device is a network device, and the second device is a terminal device, the second reference signal and the first reference signal may be CSI-RSs or DMRSs.

Optionally, when the first device is a terminal device, and the second device is a network device, the second reference signal and the first reference signal may be SRSs or DMRSs.

With reference to the second aspect, in some implementations of the second aspect, before the second device receives the first reference signal from the first device, the method further includes: The second device receives the second reference signal from the first device; and the second device sends third CSI to the first device, where the third CSI is obtained based on the second reference signal, and the third CSI is used to train a neural network to obtain the first neural network model.

With reference to the second aspect, in some implementations of the second aspect, the method further includes: The second device receives a third reference signal from the first device, where the third reference signal is a normal-density reference signal; and the second device sends fourth CSI to the first device, where the fourth CSI is obtained based on the third reference signal, and the fourth CSI is used to train the neural network to obtain an updated first neural network model.

With reference to the second aspect, in some implementations of the second aspect, before the second device receives the first reference signal from the first device, the method further includes: The second device sends a second request message to the first device, where the second request message is used to request the first reference signal, and the second request message is further used to indicate the density of the first reference signal.

Optionally, when the second device is a terminal device, the second request message may be carried in UCI.

Optionally, when the second device is a network device, the second request message may be carried in DCI.

Optionally, the second device periodically sends the second request message to the first device; or the second device sends the second request message to the first device when receiving second indication information from the first device. The second indication information is used to indicate that the first neural network model is determined.

With reference to the second aspect, in some implementations of the second aspect, before the second device receives the first reference signal from the first device, the method further includes: The second device receives first indication information from the first device, where the first indication information is used to indicate the density of the first reference signal.

Optionally, when the second device is a terminal device, the first indication information may be carried in DCI.

Optionally, when the second device is a network device, the first indication information may be carried in UCI.

With reference to the second aspect, in some implementations of the second aspect, when the second device is a terminal device, the method further includes: The second device receives an RRC message from the first device, where the RRC message includes density configuration information of the first reference signal.

With reference to the second aspect, in some implementations of the second aspect, when the second device is a network device, the method further includes: The second device sends an RRC message to the first device, where the RRC message includes density configuration information of the first reference signal.

According to a third aspect, a method for obtaining channel information is provided. The method may include: A second device receives a first reference signal from a first device, where density of the first reference signal is less than density of a second reference signal, and the second reference signal is a normal-density reference signal; the second device obtains second CSI based on first CSI and a second neural network model, where the second CSI is used to indicate channel information between the first device and the second device, and the first CSI is obtained based on the first reference signal; and the second device sends the second CSI to the first device.

It should be noted that normal density is density of a reference signal defined in a current protocol. The density of the reference signal refers to a percentage of a quantity of resources used to transmit the reference signal in a total quantity of transmission resources. For example, as defined in a current protocol, a percentage of a quantity of resources used to transmit a 32-port CSI-RS in a total quantity of transmission resources is approximately 20%. Therefore, it may be considered that normal density of the 32-port CSI-RS is 20%.

Based on the technical solution, the second neural network model is deployed on a side of the second device, so that the second device may restore all channel information (the second CSI) based on some channel information (the first CSI) and the second neural network model. Therefore, when a first neural network model is deployed on the second device, the first device may send a low-density reference signal to the second device, to reduce overheads of sending a reference signal.

Optionally, the density of the first reference signal is ½ or ¼ of the density of the second reference signal.

Optionally, when the first device is a network device, and the second device is a terminal device, the second reference signal and the first reference signal may be CSI-RSs or DMRSs.

Optionally, when the first device is a terminal device, and the second device is a network device, the second reference signal and the first reference signal may be SRSs or DMRSs.

With reference to the third aspect, in some implementations of the third aspect, before the second device receives the first reference signal from the first device, the method further includes: The second device determines the second neural network model.

In an implementation, that the second device determines the second neural network model may specifically include: The second device receives the second reference signal from the first device; and the second device trains a neural network based on third CSI, to obtain the second neural network model, where the third CSI is obtained based on the second reference signal.

With reference to the third aspect, in some implementations of the third aspect, the method further includes: The second device updates the second neural network model when a preset trigger condition is met.

In an implementation, that the second device updates the second neural network model may specifically include: The second device receives a third reference signal from the first device; and the second device trains the neural network based on fourth CSI, to obtain an updated second neural network model, where the fourth CSI is obtained based on the third reference signal.

Optionally, the preset trigger condition may be that a second timer expires, and the second timer is started when the second device receives the first reference signal from the first device.

Optionally, the preset trigger condition may be that the second device determines that demodulation performance of demodulating first data is less than a preset threshold, and the first data is sent by the first device based on the second CSI.

With reference to the third aspect, in some implementations of the third aspect, before the second device receives the first reference signal from the first device, the method further includes: The second device sends a second request message to the first device when training of the neural network is completed, where the second request message is used to request the first reference signal, and the second request message is further used to indicate the density of the first reference signal.

Optionally, when the second device is a terminal device, the second request message may be carried in UCI.

Optionally, when the second device is a network device, the second request message may be carried in DCI.

With reference to the third aspect, in some implementations of the third aspect, before the second device receives the first reference signal from the first device, the method further includes: The second device receives first indication information from the first device, where the first indication information is used to indicate the density of the first reference signal.

Optionally, when the second device is a terminal device, the first indication information may be carried in DCI.

Optionally, when the second device is a network device, the first indication information may be carried in UCI.

With reference to the third aspect, in some implementations of the third aspect, when the second device is a terminal device, the method further includes: The second device receives a radio resource control RRC message from the first device, where the RRC message includes density configuration information of the first reference signal.

With reference to the third aspect, in some implementations of the third aspect, when the second device is a network device, the method further includes: The second device sends an RRC message to the first device, where the RRC message includes density configuration information of the first reference signal.

According to a fourth aspect, a method for obtaining channel information is provided. The method may include: A first device sends a first reference signal to a second device, where density of the first reference signal is less than density of a second reference signal, the second reference signal is a normal-density reference signal, the first reference signal is used to obtain first CSI, the first CSI is used to obtain second CSI by using a second neural network model, and the second CSI is used to indicate channel information between the first device and the second device; and the first device receives the second CSI from the second device.

It should be noted that normal density is density of a reference signal defined in a current protocol. The density of the reference signal refers to a percentage of a quantity of resources used to transmit the reference signal in a total quantity of transmission resources. For example, as defined in a current protocol, a percentage of a quantity of resources used to transmit a 32-port CSI-RS in a total quantity of transmission resources is approximately 20%. Therefore, it may be considered that normal density of the 32-port CSI-RS is 20%.

Based on the technical solution, the second neural network model is deployed on a side of the second device, so that the second device may restore all channel information (the second CSI) based on some channel information (the first CSI) and the second neural network model. Therefore, when a first neural network model is deployed on the second device, the first device may send a low-density reference signal to the second device, to reduce overheads of sending a reference signal.

Optionally, the density of the first reference signal is ½ or ¼ of the density of the second reference signal.

Optionally, when the first device is a network device, and the second device is a terminal device, the second reference signal and the first reference signal may be CSI-RSs or DMRSs.

Optionally, when the first device is a terminal device, and the second device is a network device, the second reference signal and the first reference signal may be SRSs or DMRSs.

With reference to the fourth aspect, in some implementations of the fourth aspect, before the first device sends the first reference signal to the second device, the method further includes: The first device sends the second reference signal to the second device, where the second reference signal is used to obtain third CSI, and the third CSI is used to train a neural network to obtain the second neural network model.

With reference to the fourth aspect, in some implementations of the fourth aspect, the method further includes: The first device sends a third reference signal to the second device, where the third reference signal is used to obtain fourth CSI, and the fourth CSI is used to train the neural network to obtain an updated second neural network model.

With reference to the fourth aspect, in some implementations of the fourth aspect, before the first device sends the first reference signal to the second device, the method further includes: The first device receives a second request message from the second device, where the second request message is used to request the first reference signal, and the second request message is further used to indicate the density of the first reference signal.

Optionally, when the first device is a network device, the second request message may be carried in UCI.

Optionally, when the first device is a terminal device, the second request message may be carried in DCI.

With reference to the fourth aspect, in some implementations of the fourth aspect, before the first device sends the first reference signal to the second device, the method further includes: The first device sends first indication information to the second device, where the first indication information is used to indicate the density of the first reference signal.

Optionally, when the first device is a network device, the first indication information may be carried in DCI.

Optionally, when the first device is a terminal device, the first indication information may be carried in UCI.

Optionally, the first device may periodically send the first indication information to the second device; or the first device may send the first indication information to the second device when receiving third indication information from the second device. The third indication information is used to indicate that the second neural network model is determined.

With reference to the fourth aspect, in some implementations of the fourth aspect, when the first device is a network device, the method further includes: The first device sends a radio resource control RRC message to the second device, where the RRC message includes density configuration information of the first reference signal.

With reference to the fourth aspect, in some implementations of the fourth aspect, when the first device is a terminal device, the method further includes: The first device receives an RRC message from the second device, where the RRC message includes density configuration information of the first reference signal.

According to a fifth aspect, a communications apparatus is provided, and includes modules or units configured to perform the method in any one of the first aspect and the possible implementations of the first aspect.

According to a sixth aspect, a communications apparatus is provided, and includes modules or units configured to perform the method in any one of the second aspect and the possible implementations of the second aspect.

According to a seventh aspect, a communications apparatus is provided, and includes a transceiver unit and a processing unit. The transceiver unit is configured to receive a first reference signal from a first device. Density of the first reference signal is less than density of a second reference signal. The second reference signal is a normal-density reference signal. The processing unit is configured to obtain second CSI based on first CSI and a second neural network model. The second CSI is used to indicate channel information between the first device and a second device. The first CSI is obtained based on the first reference signal. The transceiver unit is further configured to send the second CSI to the first device.

Optionally, the density of the first reference signal is ½ or ¼ of the density of the second reference signal.

With reference to the seventh aspect, in some implementations of the seventh aspect, the transceiver unit is further configured to receive the second reference signal from the first device; and the processing unit is further configured to train a neural network based on third CSI, to obtain the second neural network model. The third CSI is obtained based on the second reference signal.

With reference to the seventh aspect, in some implementations of the seventh aspect, the transceiver unit is further configured to receive a third reference signal from the first device; and the processing unit is further configured to train the neural network based on fourth CSI, to obtain an updated second neural network model. The fourth CSI is obtained based on the third reference signal.

With reference to the seventh aspect, in some implementations of the seventh aspect, the transceiver unit is further configured to send a second request message to the first device when training of the neural network is completed. The second request message is used to request the first reference signal, and the second request message is further used to indicate the density of the first reference signal.

Optionally, when the communications apparatus is a terminal device, the second request message may be carried in UCI.

Optionally, when the communications apparatus is a network device, the second request message may be carried in DCI.

With reference to the seventh aspect, in some implementations of the seventh aspect, the transceiver unit is further configured to receive first indication information from the first device. The first indication information is used to indicate the density of the first reference signal.

Optionally, when the communications apparatus is a terminal device, the first indication information may be carried in DCI.

Optionally, when the communications apparatus is a network device, the first indication information may be carried in UCI.

With reference to the seventh aspect, in some implementations of the seventh aspect, when the communications apparatus is a terminal device, the transceiver unit is further configured to receive an RRC message from the first device. The RRC message includes density configuration information of the first reference signal.

With reference to the seventh aspect, in some implementations of the seventh aspect, when the communications apparatus is a network device, the transceiver unit is further configured to send an RRC message to the first device. The RRC message includes density configuration information of the first reference signal.

According to an eighth aspect, a communications apparatus is provided, and includes a transceiver unit. The transceiver unit is configured to send a first reference signal to a second device. Density of the first reference signal is less than density of a second reference signal. The second reference signal is a normal-density reference signal. The first reference signal is used to obtain first CSI, and the first CSI is used to obtain second CSI by using a second neural network model. The second CSI is used to indicate channel information between a first device and the second device. The first device receives the second CSI from the second device.

Optionally, the density of the first reference signal is ½ or ¼ of the density of the second reference signal.

With reference to the eighth aspect, in some implementations of the eighth aspect, the transceiver unit is further configured to send the second reference signal to the second device. The second reference signal is used to obtain third CSI, and the third CSI is used to train a neural network to obtain the second neural network model.

With reference to the eighth aspect, in some implementations of the eighth aspect, the transceiver unit is further configured to send a third reference signal to the second device. The third reference signal is used to obtain fourth CSI, and the fourth CSI is used to train the neural network to obtain an updated second neural network model.

With reference to the eighth aspect, in some implementations of the eighth aspect, the transceiver unit is further configured to receive a second request message from the second device. The second request message is used to request the first reference signal, and the second request message is further used to indicate the density of the first reference signal.

Optionally, when the communications apparatus is a network device, the second request message may be carried in UCI.

Optionally, when the communications apparatus is a terminal device, the second request message may be carried in DCI.

With reference to the eighth aspect, in some implementations of the eighth aspect, the transceiver unit is further configured to send first indication information to the second device. The first indication information is used to indicate the density of the first reference signal.

Optionally, when the communications apparatus is a network device, the first indication information may be carried in DCI.

Optionally, when the communications apparatus is a terminal device, the first indication information may be carried in UCI.

Optionally, the transceiver unit may periodically send the first indication information to the second device; or the transceiver unit may send the first indication information to the second device when receiving third indication information from the second device. The third indication information is used to indicate that the second neural network model is determined.

With reference to the eighth aspect, in some implementations of the eighth aspect, when the communications apparatus is a network device, the transceiver unit is further configured to send a radio resource control RRC message to the second device. The RRC message includes density configuration information of the first reference signal.

With reference to the eighth aspect, in some implementations of the eighth aspect, when the communications apparatus is a terminal device, the transceiver unit is further configured to receive an RRC message from the second device. The RRC message includes density configuration information of the first reference signal.

According to a ninth aspect, a communications apparatus is provided, and includes a processor. The processor is coupled to a memory, and may be configured to execute instructions in the memory, to implement the method in any one of the possible implementations of the first aspect and the fourth aspect. Optionally, the communications apparatus further includes the memory. Optionally, the communications apparatus further includes a communications interface, and the processor is coupled to the communications interface.

In an implementation, the communications apparatus is a first device. When the communications apparatus is a first device, the communications interface may be a transceiver or an input/output interface.

In another implementation, the communications apparatus is a chip disposed in a first device. When the communications apparatus is a chip disposed in a first device, the communications interface may be an input/output interface.

Optionally, the transceiver may be a transceiver circuit. Optionally, the input/output interface may be an input/output circuit.

According to a tenth aspect, a communications apparatus is provided, and includes a processor. The processor is coupled to a memory, and may be configured to execute instructions in the memory, to implement the method in any one of the possible implementations in the second aspect and the third aspect. Optionally, the communications apparatus further includes the memory. Optionally, the communications apparatus further includes a communications interface, and the processor is coupled to the communications interface.

In an implementation, the communications apparatus is a second device. When the communications apparatus is a second device, the communications interface may be a transceiver or an input/output interface.

In another implementation, the communications apparatus is a chip disposed in a second device. When the communications apparatus is a chip disposed in a second device, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to: receive a signal by using the input circuit, and transmit a signal by using the output circuit, so that the processor performs the method in any one of the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a twelfth aspect, a processing apparatus is provided, and includes a processor and a memory. The processor is configured to: read instructions stored in the memory, receive a signal by using a receiver, and transmit a signal by using a transmitter, to perform the method in any one of the possible implementations of the first aspect to the fourth aspect.

Optionally, there are one or more processors, and there are one or more memories.

Optionally, the memory may be integrated into the processor, or the memory and the processor are separately disposed.

In a specific implementation process, the memory may be a non-transitory (non-transitory) memory, for example, a read-only memory (read-only memory, ROM). The memory and the processor may be integrated into a same chip, or may be disposed on different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processing apparatus in the twelfth aspect may be one or more chips. The processor in the processing apparatus may be implemented by hardware or software. When being implemented by hardware, the processor may be a logic circuit, an integrated circuit, or the like. When being implemented by software, the processor may be a general-purpose processor, and is implemented by reading software code stored in the memory. The memory may be integrated into the processor, or may be located outside the processor and exist alone.

According to a thirteenth aspect, a computer program product is provided. The computer program product includes a computer program (which may also be referred to as code or an instruction). When the computer program is run, a computer is enabled to perform the method in any one of the possible implementations of the first aspect to the fourth aspect.

According to a fourteenth aspect, a computer-readable medium is provided. The computer-readable medium stores a computer program (which may also be referred to as code or an instruction). When the computer program is run on a computer, the method in any one of the possible implementations of the first aspect to the fourth aspect is performed.

According to a fifteenth aspect, a communications system is provided, and includes the foregoing first device and the foregoing second device.

DESCRIPTION OF EMBODIMENTS

Figure 1:
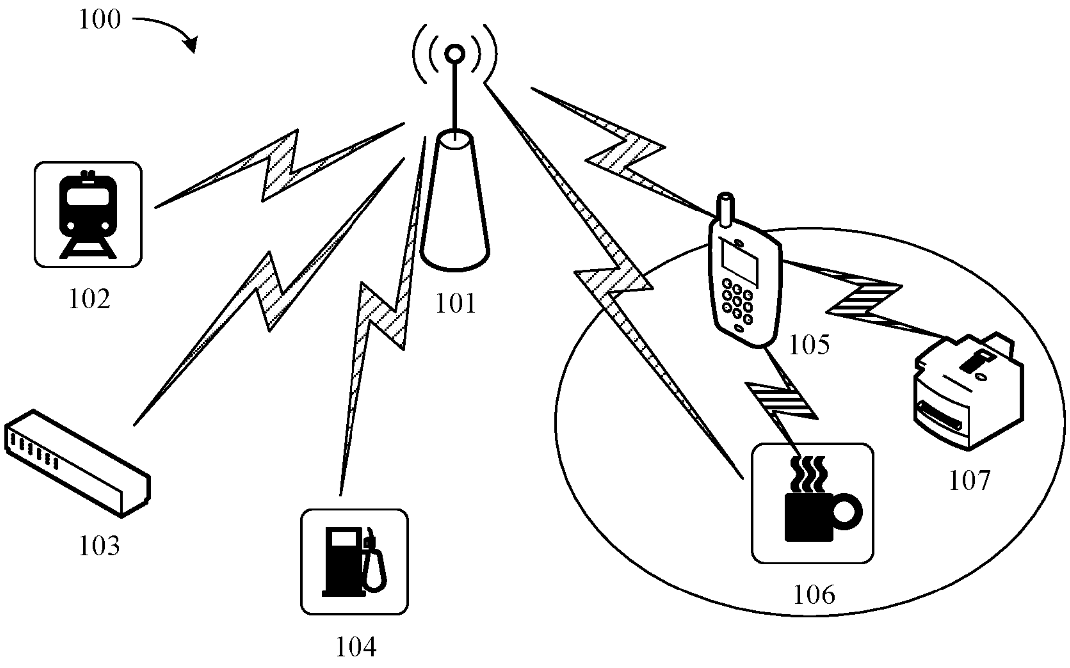
FIG. 1 is a schematic diagram of a communications system applicable to an embodiment of this application.

The following describes technical solutions of this application with reference to the accompanying drawings.

The technical solutions in the embodiments of this application may be applied to various communications systems, for example, a long term evolution (Long Term Evolution, LTE) system, an LTE frequency division duplex (frequency division duplex, FDD) system, LTE time division duplex (time division duplex, TDD), a universal mobile telecommunication system (universal mobile telecommunication system, UMTS), a worldwide interoperability for microwave access (worldwide interoperability for microwave access, WiMAX) communications system, a 5th generation (5th Generation, 5G) mobile communications system, or a new radio access technology (new radio access Technology, NR). The 5G mobile communications system may include non-standalone (non-standalone, NSA) and/or standalone (standalone, SA).

The technical solutions provided in this application may be further applied to machine type communication (machine type communication, MTC), long term evolution-machine type communication (Long Term Evolution-machine, LTE-M), a device-to-device (device to device, D2D) network, a machine-to-machine (machine to machine, M2M) network, an internet of things (internet of things, IoT) network, or another network. The IoT network may include, for example, an internet of vehicles. Communication modes in an internet of vehicles system are collectively referred to as vehicle-to-X (vehicle to X, V2X, where X can stand for anything). For example, V2X may include vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

The technical solutions provided in this application may be further applied to another communications system, for example, a 6th generation (6th Generation, 6G) mobile communications system. This is not limited in this application.

In the embodiments of this application, a network device may be any device with a wireless transceiver function. The device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB or a home Node B, HNB), a baseband unit (baseband unit, BBU), an access point (access point, AP) in a wireless fidelity (wireless fidelity, WiFi) system, a wireless relay node, a wireless backhaul node, a transmission point (transmission point, TP), a transmission and reception point (transmission and reception point, TRP), a gNB or a transmission point (TRP or TP) in a 5G system such as an NR system, one antenna panel or one group of antenna panels (including a plurality of antenna panels) of a base station in a 5G system, a network node that forms a gNB or a transmission point, for example, a baseband unit (BBU) or a distributed unit (distributed unit, DU), or a base station in a 6G communications system.

In some deployment, the gNB may include a central unit (central unit, CU) and the DU. The gNB may further include an active antenna unit (active antenna unit, AAU). The CU implements some functions of the gNB, and the DU implements some functions of the gNB. For example, the CU is responsible for processing a non-real-time protocol and service and implementing functions of a radio resource control (radio resource control, RRC) layer and a packet data convergence protocol (packet data convergence protocol, PDCP) layer. The DU is responsible for processing a physical layer protocol and a real-time service and implementing functions of a radio link control (radio link control, RLC) layer, a medium access control (medium access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

The network device provides a service for a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), or the like. These small cells are characterized by a small coverage area and low transmit power, and are suitable for providing a high-rate data transmission service.

The terminal device in embodiments of this application may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like.

The terminal device may be a device that provides voice/data connectivity for a user, for example, a handheld device or a vehicle-mounted device with a wireless connection function. Currently, some examples of the terminal may be a mobile phone (mobile phone), a tablet computer (pad), a computer (for example, a laptop or a palmtop computer) with a wireless transceiver function, a mobile internet device (mobile internet device, MID), a virtual reality (virtual reality, VR) device, an augmented reality (augmented reality, AR) device, a wireless terminal in industrial control (industrial control), a wireless terminal in self-driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a cellular telephone, a cordless telephone, a session initiation protocol (session initiation protocol, SIP) telephone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal device in a 5G network, or a terminal device in a future evolved public land mobile network (public land mobile network, PLMN).

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be a terminal device in an internet of things (internet of things, IoT) system. IT is an important part of future information technology development. A main technical feature of IoT is to connect things to a network by using a communications technology, to implement an intelligent network in which man and a machine are connected and things are connected. In an IoT technology, massive connections, deep coverage, and power saving of a terminal may be implemented by using, for example, a narrowband (narrow band, NB) technology.

In addition, the terminal device may further include sensors such as an intelligent printer, a train detector, and a gas station. Main functions include collecting data (some terminal devices), receiving control information and downlink data of a network device, sending an electromagnetic wave, and transmitting uplink data to the network device.

For ease of understanding the embodiments of this application, a communications system applicable to a method provided in the embodiments of this application is first described in detail with reference to FIG. 1. FIG. 1 is a schematic diagram of a communications system 100 applicable to the method provided in the embodiments of this application. As shown in the figure, the communications system 100 may include at least one network device, for example, a network device 101 in a 5G system shown in FIG. 1. The communications system 100 may further include at least one terminal device, for example, terminal devices 102 to 107 shown in FIG. 1. The terminal devices 102 to 107 may be mobile or fixed. The network device 101 may communicate with one or more of the terminal devices 102 to 107 by using a radio link. Each network device may provide communication coverage for a specific geographical area, and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 form a communications system.

Optionally, the terminal devices may directly communicate with each other. For example, the terminal devices may directly communicate with each other by using a D2D technology. As shown in the figure, terminal devices 105 and 106 and terminal devices 105 and 107 may directly communicate with each other by using the D2D technology. The terminal device 106 and the terminal device 107 may independently or simultaneously communicate with the terminal device 105.

Each of the terminal devices 105 to 107 may further communicate with the network device 101, for example, may directly communicate with the network device 101. For example, the terminal devices 105 and 106 in the figure may directly communicate with the network device 101. Alternatively, each of the terminal devices 105 to 107 may indirectly communicate with the network device 101. For example, the terminal device 107 in the figure communicates with the network device 101 by using the terminal device 106.

It should be understood that FIG. 1 shows an example in which there is one network device, a plurality of terminal devices, and a communications link between communications devices. Optionally, the communications system 100 may include a plurality of network devices, and a coverage area of each network device may include another quantity of terminal devices, for example, more or fewer terminal devices. This is not limited in this application.

A plurality of antennas may be configured for each of the communications devices such as the network device 101 and the terminal devices 102 to 107 in FIG. 1. The plurality of antennas may include at least one transmit antenna configured to send a signal and at least one receive antenna configured to receive a signal. In addition, each communications device further includes a transmitter chain and a receiver chain. A person of ordinary skill in the art may understand that each communications device may include a plurality of components (for example, a processor, a modulator, a multiplexer, a demodulator, a demultiplexer, or an antenna) related to signal sending and receiving. Therefore, the network device and the terminal device may communicate by using a multi-antenna technology.

Optionally, the wireless communications system 100 may further include other network entities such as a network controller and a mobility management entity. This is not limited in the embodiments of this application.

In a wireless communications system, a MIMO technology is usually used to increase a system capacity, that is, a plurality of antennas are used at each of a transmit end and a receive end. Theoretically, the plurality of antennas are used with reference to spatial multiplexing, and therefore the system capacity can be exponentially increased. However, actually, a problem of interference enhancement is caused due to use of the plurality of antennas. Therefore, specific processing needs to be performed on a signal to suppress impact of interference. This method for suppressing interference by performing signal processing may be implemented at the receive end or the transmit end. When this method is implemented at the transmit end, a to-be-sent signal may be preprocessed, and then sent through a MIMO channel. This sending manner is referred to as precoding.

To identify a useful channel in a MIMO channel matrix H, a plurality of channels need to be converted into one-to-one modes similar to single-input single-output (single input single output, SISO) system, so that a transmit signal S1 corresponds to a received signal R1, a transmit signal S2 corresponds to a received signal R2, and so on. In other words, a plurality of MIMO cross channels are converted into a plurality of one-to-one channels parallel to each other. This process may be implemented by performing singular value decomposition (singular value decomposition, SVD) on H, in other words, $H=U\Sigma V^T$, where U and V are orthogonal matrices, and $\Sigma$ is a diagonal matrix. Non-zero elements (elements on a diagonal line) of the diagonal matrix are singular values of the channel matrix H. Usually, these singular values may be arranged in descending order. The superscript "T" represents a transposition operation. For example, $r=H*s+n$ may be written as $r=U\Sigma V^T*s+n$ where r is a received signal, s is a transmit signal, and n is channel noise. When to-be-sent data is x, it may be set that s=Vx. At the receive end, a received signal is decoded by using $\Sigma^{-1}U^T$, to obtain a plurality of one-to-one channels without interference. At the transmit end, s=Vx is a precoding operation, and V is a precoding matrix.

It may be learned from the foregoing description that to obtain a precoding matrix that matches the MIMO channel, the MIMO channel needs to be known. Therefore, the MIMO channel needs to be estimated.

Figure 2:
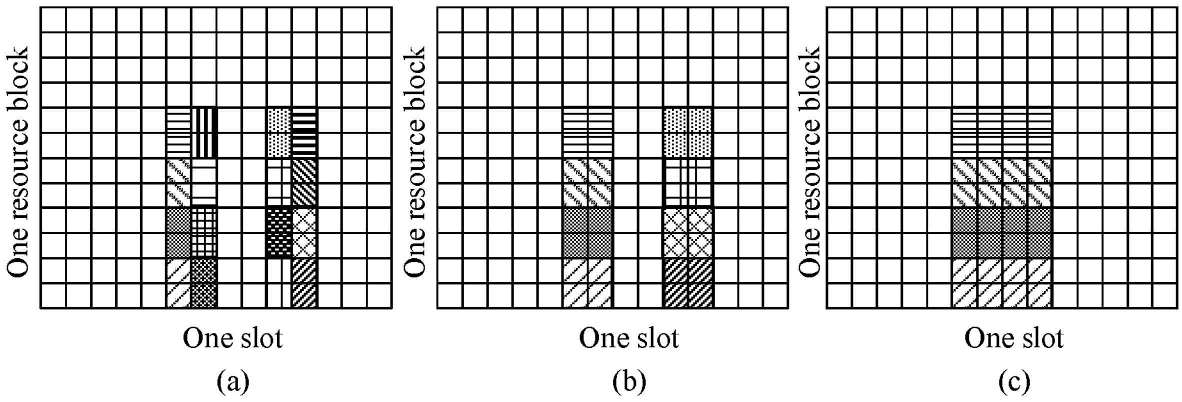
FIG. 2 is a schematic diagram of a placement location of a 32-port CSI-RS on a radio transmission resource.

Usually, in a wireless communications system, channel estimation is performed by placing a reference signal known to both a transmit end and a receive end on a radio transmission resource. For example, FIG. 2 shows a placement location of a 32-port CSI-RS in an NR system. It may be learned from the figure that the CSI-RS needs to occupy approximately 20% of transmission resources, and there are relatively high overheads.

In view of this, the embodiments of this application provide a method for obtaining channel information, to reduce overheads of sending a reference signal by a transmit end or reduce feedback overheads of feeding back CSI by a receive end.

The method for obtaining channel information provided in the embodiments of this application is described below in detail with reference to the accompanying drawings.

It should be understood that for ease of understanding and description, the method provided in the embodiments of this application is described below in detail by using interaction between a terminal device and a network device as an example. However, this should constitute no limitation on an execution body of the method provided in this application. For example, a terminal device shown in the following embodiments may be replaced with a component (for example, a chip or a chip system) disposed in the terminal device, and a network device shown in the following embodiments may be replaced with a component (for example, a chip or a chip system) disposed in the network device.

A specific structure of an execution body of a method provided in embodiments of this application is not specifically limited in the following embodiments, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

The method for obtaining channel information provided in the embodiments of this application is described below in detail with reference to FIG. 3 to FIG. 11.

Figure 3:
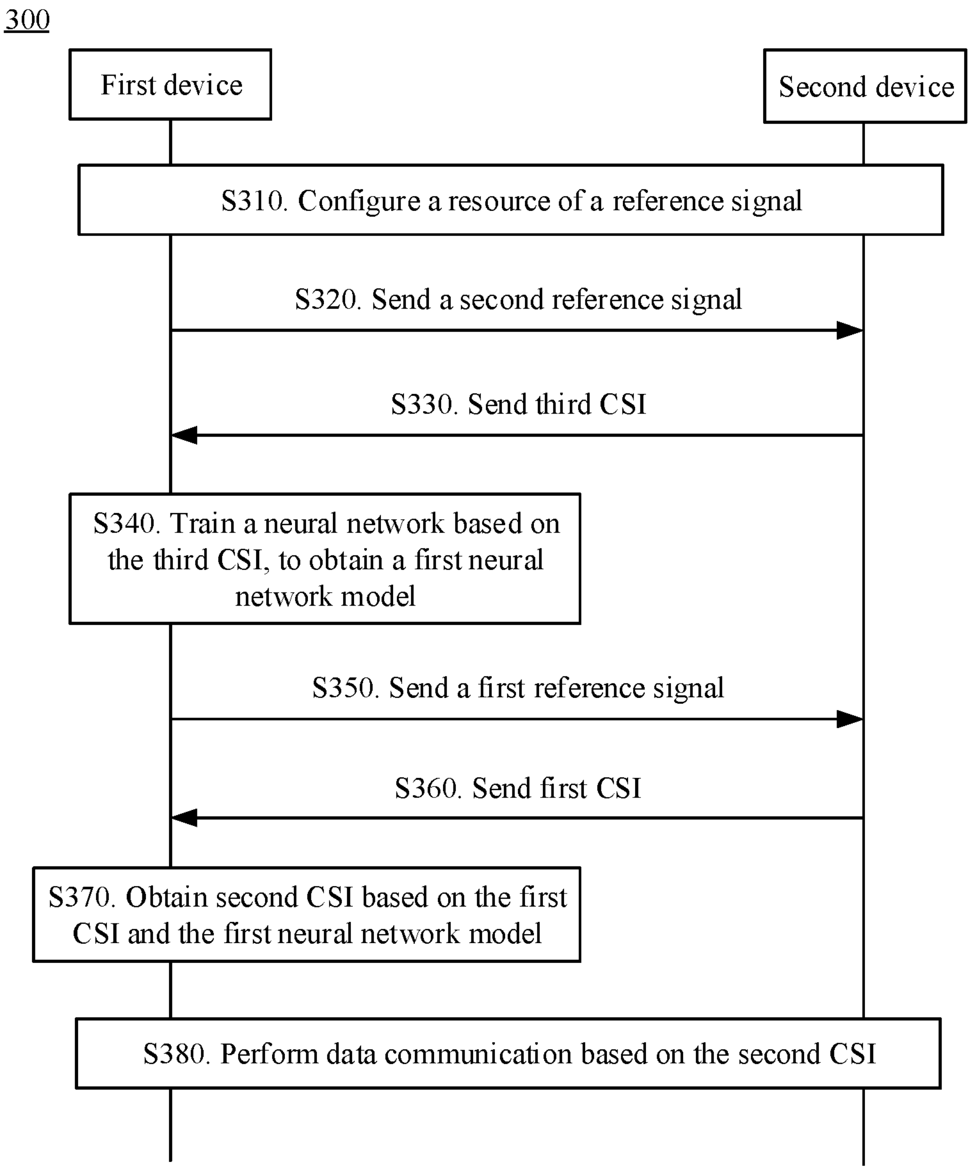
FIG. 3 is a schematic flowchart of a method for obtaining channel information according to an embodiment of this application.

FIG. 3 is a schematic flowchart of a method 300 for obtaining channel information according to an embodiment of this application from a perspective of device interaction. The method 300 shown in FIG. 3 may include S310 to S380. The steps in the method 300 are described below in detail.

S310. Configure a resource of a reference signal.

Specifically, when a first device is a network device, and a second device is a terminal device, the first device may send configuration information of the reference signal to the second device, to configure, for the second device, a resource used to receive the reference signal.

When a first device is a terminal device, and a second device is a network device, the second device may send configuration information of the reference signal to the first device, to configure, for the first device, a resource used to send the reference signal.

The reference signal may be a channel state information reference signal (channel state information reference signal, CSI-RS), a demodulation reference signal (demodulation reference signal, DMRS), a sounding reference signal (sounding reference signal, SRS), or the like. The configuration information of the reference signal may include density configuration information or the like of the reference signal.

The configuration information of the reference signal may be carried in an RRC message. A format of the RRC message provided in this embodiment of the application is described below by using an RRC message used to configure density of a CSI-RS as an example.

The RRC message used to configure the density of the CSI-RS is as follows:

```
--ASN1START
--TAG-CSI-RS-RESOURCEMAPPING-START
CSI-RS-ResourceMapping::=SEQUENCE {
 frequencyDomainAllocation CHOICE {
  row1 BTT STRING (SIZE (4)),
  row2 BTT STRING (SIZE (12)),
  row3 BTT STRING (SIZE (3)),
  other BTT STRING (SIZE (4)),
 },
 nrofPorts ENUMERATED {p1,p2,p4,p8,p12,p16,p32},
 firstOFDMSymbolInTimeDomain INTEGER (0..13),
 firstOFDMSymbolInTimeDomain2 INTEGER (2..12),
OPTIONAL, --Need R
 cdm-Type ENUMERATED {noCDM, fd-CMD2,
cdm4-FD2-TD2, cdm8-FD2-TD4},
 density CHOICE {
   dot5 ENUMERATED {evenPRBs, oddPRBs},
   one NULL,
   three NELL,
   spare NULL
 },
 freqBand CSI-FrequencyOccupation,
 PortDensity CHOICE {
   one NULL,
   half NULL,
```

-continued

```
    quarter NULL,
    ...
  },
  ...
}
--TAG-CSI-RS-RESOURCEMAPPING-STOP
--ASN1STOP
```

Based on the format of the RRC message provided in this embodiment of this application, resources of CSI-RSs with two types of densities may be configured at a time. Density indicated in the density CHOICE field is normal density, namely, density of a reference signal defined in a current NR protocol, namely, density of a second reference signal or a third reference signal mentioned below. Density indicated in the PortDensity field is low density in this embodiment of this application, namely, density of a first reference signal mentioned below. Each option in the PortDensity field represents a proportion of the low density to the normal density. For example, “one” represents that the low density is equal to the normal density, “half” represents that the low density is ½ of the normal density, and “quarter” represents that the low density is ¼ of the normal density.

It should be understood that in this embodiment of this application, it is merely an example to name a field used to configure density of a low-density reference signal “PortDensity”, and this should constitute no limitation on this embodiment of this application.

It should be further understood that in the foregoing description, the format of the RRC message used to configure the CSI-RS is merely used as an example for description, and this should constitute no limitation on this embodiment of this application. In this embodiment of this application, a PortDensity field may be newly added to an RRC message used to configure a DMRS, to configure a low-density DMRS. Alternatively, in this embodiment of this application, a PortDensity field may be newly added to an RRC message used to configure an SRS, to configure a low-density SRS.

It should be further understood that in the foregoing description, that the PortDensity field includes three options “one”, “half”, and “quarter” is merely used as an example for description, and this should constitute no limitation on this embodiment of this application. For example, the PortDensity field may further include options such as “one third” and “one eighth”.

The density of the low-density reference signal is not limited in this embodiment of this application. Specifically, in different application scenarios, the network device may send different RRC messages to the terminal device, to configure resources of low-density reference signals with different density.

In an example, when there is a relatively stable channel between the network device and the terminal device (for example, the terminal device is indoors, the terminal device remains stationary, or the terminal device moves slowly), the network device may configure a low-density reference signal with relatively low density. For example, the network device may configure a low-density reference signal whose density is ¼ of the normal density. In this case, an RRC message sent by the network device to the terminal device may be as follows:

```
... ...
PortDensity CHOICE {
 quarter NULL
},
... ...
```

In another example, when there is an unstable channel between the network device and the terminal device (for example, the terminal device moves quickly), the network device may configure a low-density reference signal with relatively high density. For example, the network device may configure a low-density reference signal whose density is ½ of the normal density. In this case, an RRC message sent by the network device to the terminal device may be as follows:

```
... ...
PortDensity CHOICE {
 half NULL
},
... ...
```

S320. The first device sends the second reference signal to the second device. Correspondingly, in S320, the second device receives the second reference signal from the first device.

When the first device is a network device, and the second device is a terminal device, the second reference signal may be a CSI-RS or a DMRS.

When the first device is a terminal device, and the second device is a network device, the second reference signal may be a DMRS or an SRS.

Specifically, the first device sends the second reference signal by using the normal density configured in the RRC message. The normal density is the density of the reference signal defined in the current NR protocol. The density of the reference signal refers to a percentage of a quantity of resources used to transmit the reference signal in a total quantity of transmission resources. That the first device sends the second reference signal by using the normal density may mean that a quantity of transmit ports used by the network device to send the second reference signal is equal to a quantity of transmit ports of the reference signal defined in the current NR protocol. For example, if the second reference signal is a 32-port CSI-RS, when the first device sends the 32-port CSI-RS based on the normal density, a quantity of transmit ports used by the first device is 32.

S330. The second device sends third CSI to the first device. Correspondingly, in S330, the first device receives the third CSI from the second device.

The third CSI is obtained by the second device based on the second reference signal.

When the first device is a network device, and the second device is a terminal device, the third CSI may be downlink CSI.

When the first device is a terminal device, and the second device is a network device, the third CSI may be uplink CSI.

S340. The first device trains a neural network based on the third CSI, to obtain a first neural network model.

A specific manner in which the first device trains the neural network is not limited in this embodiment of this application.

In an example, the neural network may be trained by using channel data and a method for fusing and embedding features of the channel data in a plurality of domains.

Figure 4:
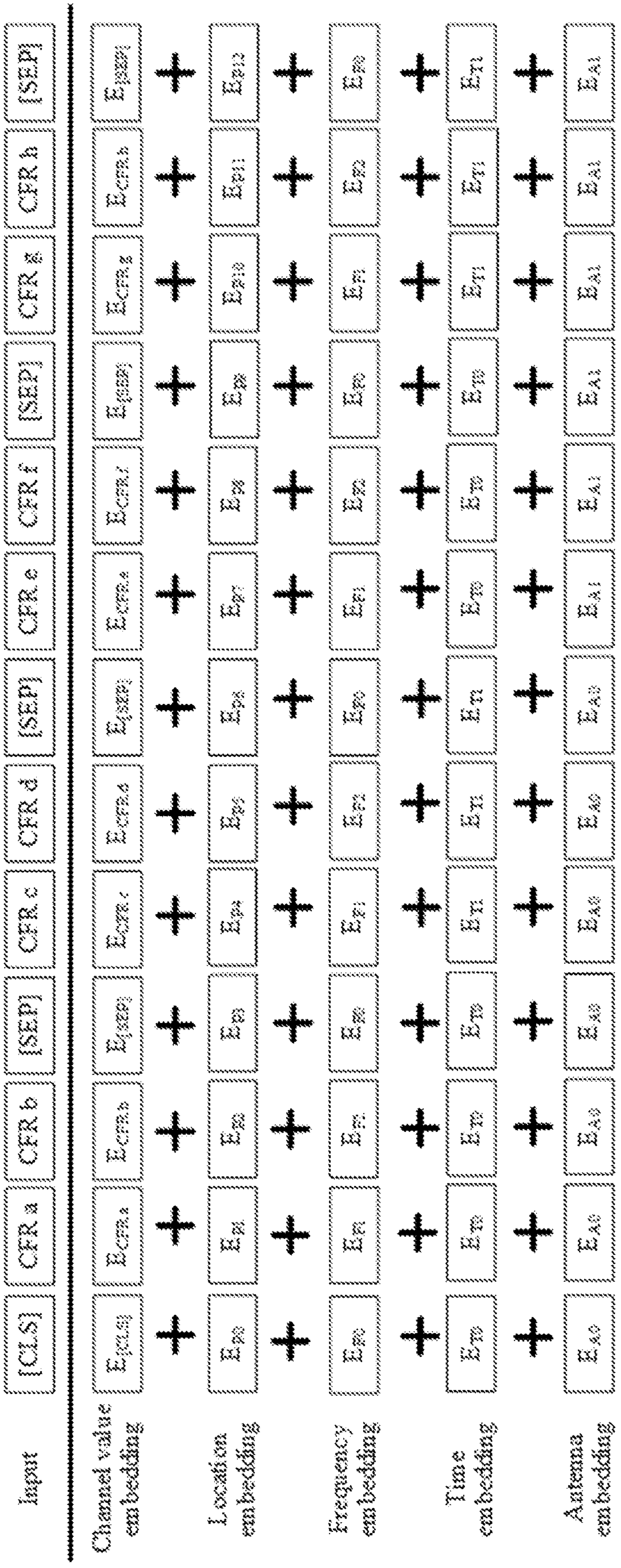
FIG. 4 is a schematic diagram of a method for training a neural network according to an embodiment of this application.

As shown in FIG. 4, a channel frequency response (channel frequency response, CFR) (for example, a CFR a to a CFR h shown in FIG. 4) obtained based on a reference signal is used as input data; further, a CFR value may be represented by a vector, and each channel feature of the CFR may also be represented by a vector; and further, the embedding vectors of the CFR and the channel feature of the CFR are added and calculated in the neural network as a fusion result, to train the neural network.

As shown in FIG. 4, in addition to the CFR, the input data may further include special marks such as [channel load sensing (channel load sensing, CLS)] and [separator (separator, SEP)], [CLS] is used to classify CFRs and the like in a subsequent downstream task, and [SEP] is used to separate CFRs in different domains.

In addition to embedding of the channel data, there may further be location embedding. For example, if the channel data is not input to the neural network in a form of a sequence, but is input to the neural network in parallel, there needs to be an embedding vector (for example, location embedding vectors $E_{P0}$ to $E_{P12}$ shown in FIG. 4) for each location, so that the neural network can learn of a location relationship between channel data inputs.

The features of the channel data in a plurality of domains may include a frequency feature, a time feature, a spatial feature, and the like. The frequency feature may represent a frequency feature related to a frequency, a subcarrier, or the like. For example, $E_{F1}$ and $E_{F2}$ shown in FIG. 4 may respectively represent frequency embedding vectors related to two different subcarriers. The time feature may be a time feature related to time, a time offset, or the like. For example, $E_{T0}$ and $E_{T1}$ shown in FIG. 4 may respectively represent time embedding vectors related to two different subframes. The spatial feature is represented by an antenna difference in terms of channel data, and may represent an antenna-related feature. For example, $E_{A0}$ and $E_{A1}$ shown in FIG. 4 may respectively represent antenna embedding vectors related to two different receive antennas or two different transmit antennas.

Specifically, the first device uses a part of the received third CSI as input data of training the neural network, and the first device may determine, based on the density of the low-density reference signal configured in the RRC message, a size of the CSI used as the input data.

For example, when the density of the low-density reference signal configured in the RRC message is ½ of the normal density, the first device uses ½ of the third CSI as the input data of training the neural network.

For another example, when the density of the low-density reference signal configured in the RRC message is ¼ of the normal density, the first device uses ¼ of the third CSI as the input data of training the neural network.

Further, the first device compares an output result of the neural network with the third CSI. When a difference between the output result and the third CSI is less than a preset threshold, it is considered that training of the neural network is completed, in other words, the first neural network model is obtained.

It should be understood that when the difference between the output result of the neural network and the third CSI is greater than or equal to the preset threshold, it is considered that training of the neural network is not completed. In this case, S320 to S340 in the method 300 continue to be performed, until the difference between the output result of the neural network and the third CSI is less than the preset threshold, and in this case, S350 to S370 in the method 300 are performed.

S350. The first device sends the first reference signal to the second device. Correspondingly, in S350, the second device receives the first reference signal from the first device.

The density of the first reference signal is less than or equal to the density of the second reference signal.

When the first device is a network device, and the second device is a terminal device, the first reference signal may be a CSI-RS or a DMRS.

When the first device is a terminal device, and the second device is a network device, the first reference signal may be a DMRS or an SRS.

In some possible implementations, the first device sends the first reference signal by using the low density configured in the RRC message. The low density is density less than the normal density. That the first device sends the first reference signal by using the low density means that a quantity of transmit ports used by the first device to send the first reference signal is less than the quantity of transmit ports of the reference signal defined in the current NR protocol. For example, if the first reference signal is a 32-port CSI-RS, when the first device sends the 32-port CSI-RS based on the low density, a quantity of transmit ports used by the first device is less than 32.

The density of the first reference signal is not limited in this embodiment of this application. As described above, in different application scenarios, the network device may send different RRC messages to configure first reference signals with different density.

In an example, the density of the first reference signal may be ½ of the density of the second reference signal. In other words, the quantity of transmit ports used by the first device to send the first reference signal is ½ of the quantity of transmit ports used to send the second reference signal. For example, when the second reference signal and the first reference signal are 32-port CSI-RSs, the quantity of transmit ports used by the first device to send the second reference signal is 32, and the quantity of transmit ports used to send the first reference signal is 16.

In another example, the density of the first reference signal may be ¼ of the density of the second reference signal. In other words, the quantity of transmit ports used by the first device to send the first reference signal is ¼ of the quantity of transmit ports used to send the second reference signal. For example, when the second reference signal and the first reference signal are 32-port CSI-RSs, the quantity of transmit ports used by the first device to send the second reference signal is 32, and the quantity of transmit ports used to send the first reference signal is 8.

A placement location of the first reference signal on a radio transmission resource is not limited in this embodiment of this application. In other words, the transmit port used by the first device to send the first reference signal is not limited in this embodiment of this application.

In this embodiment of this application, the placement location of the first reference signal may be configured as a part of a placement location of the second reference signal. In other words, the first device may send the first reference signal by using some of transmit ports used to send the second reference signal. For example, when the second reference signal and the first reference signal are 32-port CSI-RSs, if the transmit ports used by the first device to send the second reference signal are a port #1 to a port #32, the first device may send the first reference signal by using some of the port #1 to the port #32. For example, if the density of the first reference signal is ½ of the density of the second reference signal, the first device may send the first reference signal by using 16 ports in the port #1 to the port #32. For example, the first device may send the first reference signal by using the port #1 to a port #16, or may send the first reference signal by using a port #17 to the port #32.

Figure 5:
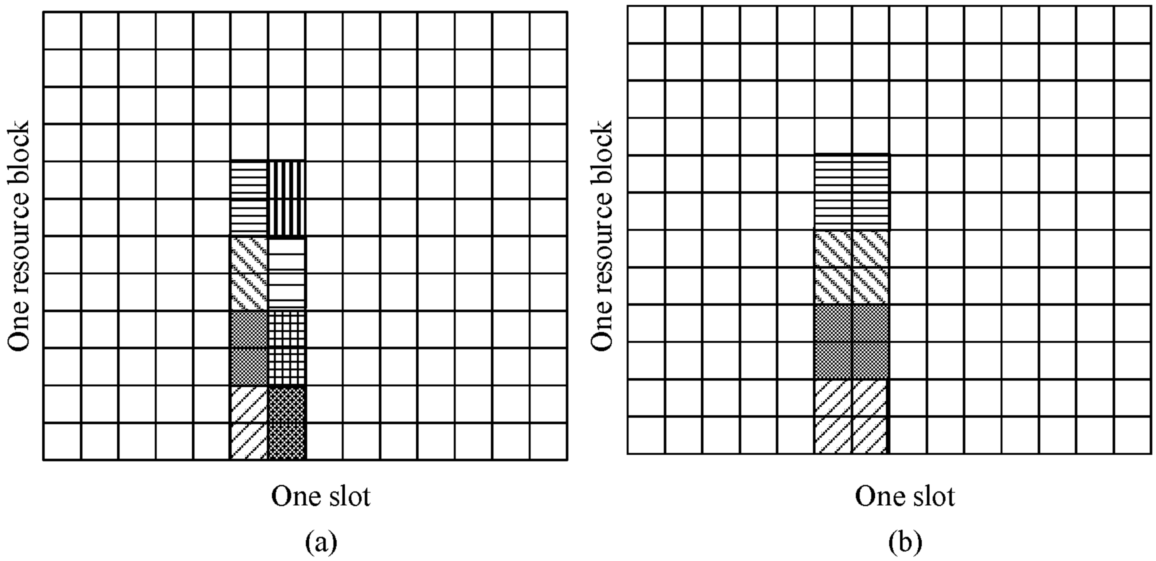
FIG. 5 to FIG. 8 are schematic diagrams of a placement location of a low-density CSI-RS on a radio transmission resource according to an embodiment of this application.

Several examples of the placement location of the first reference signal on the radio transmission resource are provided below by using an example in which the second reference signal and the first reference signal are 32-port CSI-RSs and with reference to FIG. 5 to FIG. 8. CSI-RSs of different ports are mapped and sent in a resource multiplexing manner in which time division, frequency division, and code division are combined. For example, in FIG. 5 to FIG. 8, grids with different filling patterns represent placement locations of CSI-RSs of different ports in two dimensions, namely, a time dimension and a frequency dimension. A required CSI-RS placement resource may be obtained with reference to code division multiplexing. For example, (a) in FIG. 5 is used, and a 16-port CSI-RS needs to be carried. There are grids with eight different filling patterns in the figure, and each filling pattern occupies two grids, in other words, occupies two resource elements (Resource Element, RE). Two codewords (for example, [1, 1] and [1, −1]) with a length of 2 are used on two REs with a same filling pattern, to implement code division multiplexing. Therefore, REs occupied by the eight filling patterns may carry a total of 16 CSI-RSs.

Figure 6:
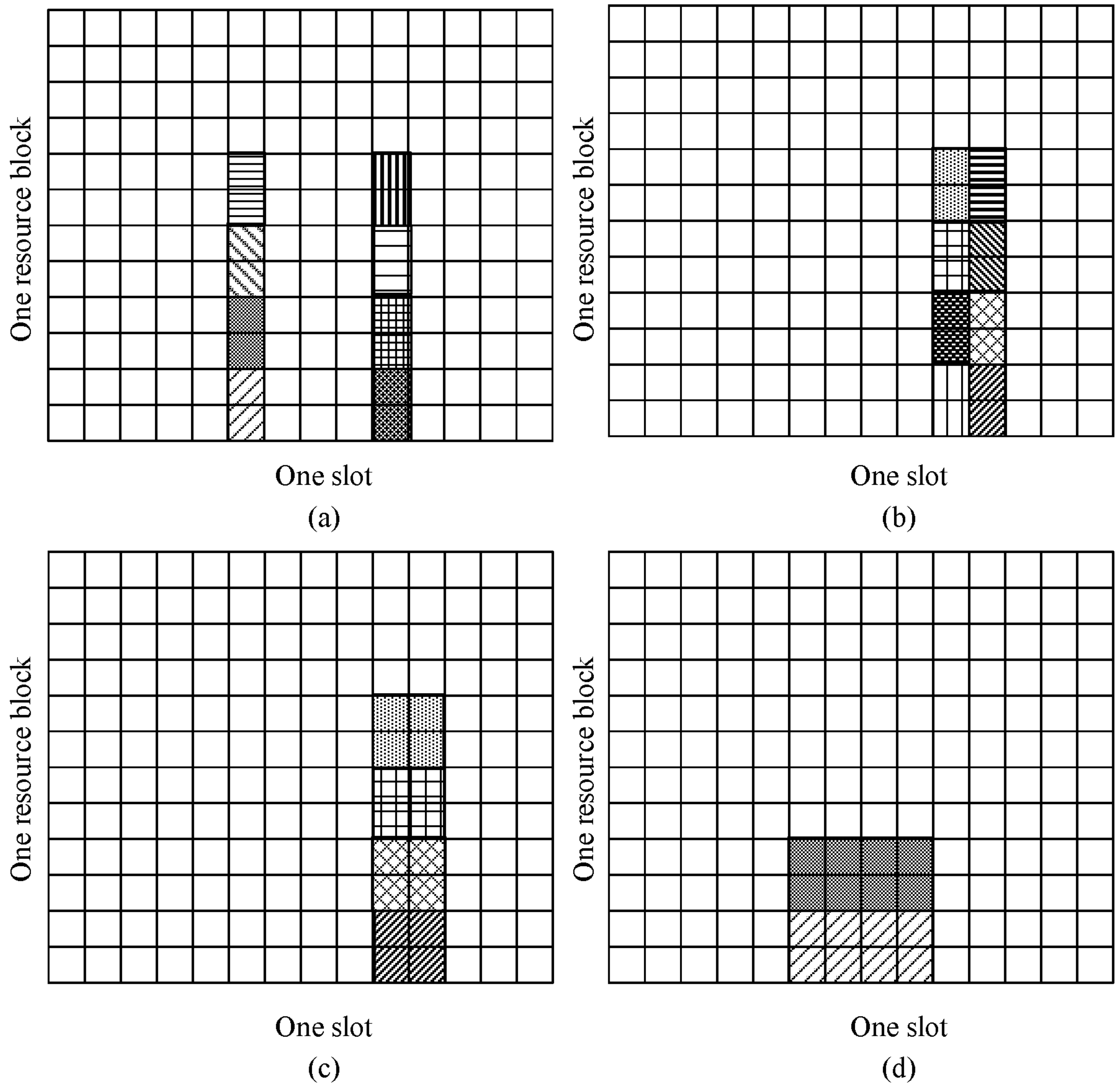

FIG. 5 and FIG. 6 show examples that are of the placement location of the first reference signal and that exist when the density of the first reference signal is ½ of the density of the second reference signal. When the density of the first reference signal is ½ of the density of the second reference signal, the first reference signal needs to carry 16 ports. Therefore, a placement location of a 16-port CSI-RS with the normal density may be directly used for the placement location of the first reference signal, for example, (a) in FIG. 5 and (b) in FIG. 5.

As shown in FIG. 6, the placement location of the first reference signal may be any half of a placement location of a 32-port CSI-RS with the normal density. For example, the placement location of the first reference signal shown in each of (a) and (b) in FIG. 6 is a half of the placement location of the 32-port CSI-RS shown in (a) in FIG. 2, the placement location of the first reference signal shown in (c) in FIG. 6 is a half of the placement location of the 32-port CSI-RS shown in (b) in FIG. 2, and the placement location of the first reference signal shown in (d) in FIG. 6 is a half of the placement location of the 32-port CSI-RS shown in (c) in FIG. 2.

Figure 7:
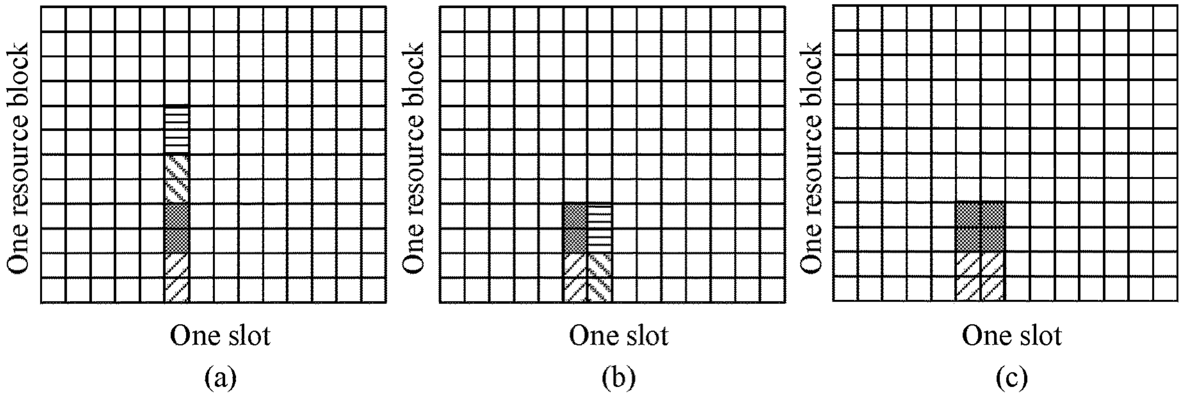
Figure 8:
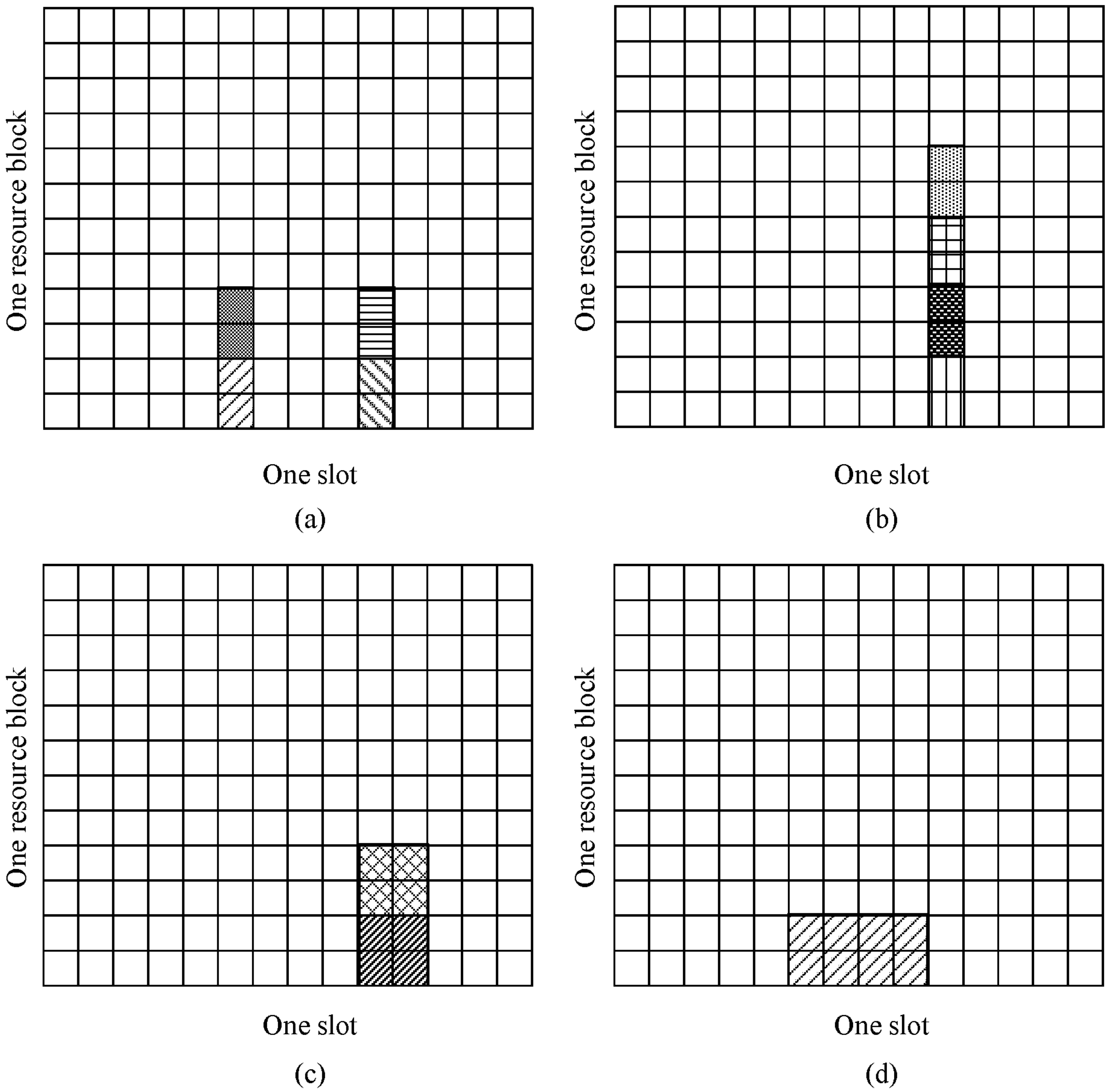

FIG. 7 and FIG. 8 show examples that are of the placement location of the first reference signal and that exist when the density of the first reference signal is ¼ of the density of the second reference signal. When the density of the first reference signal is ¼ of the density of the second reference signal, the first reference signal needs to carry eight ports. Therefore, a placement location of an 8-port CSI-RS with the normal density may be directly used for the placement location of the first reference signal, for example, (a), (b), and (c) in FIG. 7.

As shown in FIG. 8, the placement location of the first reference signal may alternatively be any ¼ of a placement location of a 32-port CSI-RS with the normal density. For example, the placement location of the first reference signal shown in each of (a) and (b) in FIG. 8 is ¼ of the placement location of the 32-port CSI-RS shown in (a) in FIG. 2, the placement location of the first reference signal shown in (c) in FIG. 6 is ¼ of the placement location of the 32-port CSI-RS shown in (b) in FIG. 2, and the placement location of the first reference signal shown in (d) in FIG. 6 is ¼ of the placement location of the 32-port CSI-RS shown in (c) in FIG. 2.

In some other possible implementations, the first device may alternatively send the first reference signal by using the normal density configured in the RRC message. In this case, the density of the first reference signal is equal to the density of the second reference signal.

S360. The second device sends first CSI to the first device. Correspondingly, in S360, the first device receives the first CSI from the second device.

When the density of the first reference signal is less than the density of the second reference signal, the first CSI is obtained by the second device based on the first reference signal. It may be understood that in this case, the density of the first reference signal is less than the density of the second reference signal, and therefore a size of the first CSI obtained by the second device based on the first reference signal is less than a size of the third CSI obtained based on the second reference signal. In other words, when the third CSI obtained by the second device based on the second reference signal represents all channel information between the first device and the second device, the first CSI obtained by the second device based on the first reference signal represents some channel information between the first device and the second device.

When the density of the first reference signal is equal to the density of the second reference signal, the first CSI is obtained by the second device based on a part of the first reference signal. Specifically, the second device obtains the first CSI based on a part of the first reference signal received on a resource used to receive a low-density reference signal. For example, the second reference signal and the first reference signal are 32-port CSI-RSs. In this case, if resources that are configured in the RRC message and that are used to transmit a normal-density reference signal and the low-density reference signal are respectively shown in (a) in FIG. 2 and (a) in FIG. 5, when the density of the first reference signal is equal to the density of the second reference signal, the first device sends the first reference signal by using the normal density configured in the RRC message, in other words, sends the first reference signal on a resource used to transmit the second reference signal. In this case, the second device obtains the first CSI based on the part of the first reference signal received on the resource used to receive the low-density reference signal, in other words, the second device obtains the first CSI based on a part of the first reference signal received on the resource shown in (a) in FIG. 5.

It may be understood that the second device obtains the first CSI based on a part of the first reference signal, and therefore a size of the first CSI is less than a size of the third CSI. In other words, when the third CSI obtained by the second device based on the second reference signal represents all channel information between the first device and the second device, the first CSI obtained by the second device based on a part of the first reference signal represents some channel information between the first device and the second device.

Further, the second device sends the obtained first CSI to the first device.

S370. The first device obtains second CSI based on the first CSI and the first neural network model.

The second CSI is used to indicate channel information between the first device and the second device.

Specifically, the first device may input the first CSI to the first neural network model as input data, to obtain the second CSI.

S380. The first device performs data communication with the second device based on the second CSI.

Specifically, the first device may calculate a precoding matrix based on the second CSI, and send the precoding matrix to the second device. Further, the first device sends first data to the second device by using the precoding matrix. Correspondingly, after receiving the first data from the first device, the second device demodulates the first data by using the precoding matrix.

Specifically, S350, S360, and S370 may be repeated for a plurality of times based on duration of communication between the first device and the second device, in other words, three operations of sending the first reference signal by the first device, feeding back the first CSI by the second device, and obtaining the second CSI by the first device based on the first CSI and the first neural network model are repeated for a plurality of times.

In this embodiment of this application, the neural network is deployed on a side of the first device, and the neural network is trained based on some channel information in all the channel information (the third CSI), to obtain the first neural network model, so that the first device may restore all the channel information (the second CSI) based on the some channel information (the first CSI) and the first neural network model. Therefore, when the first device obtains the first neural network model, the second device may feed back only the some channel information (the first CSI) to the first device, to reduce feedback overheads of the second device.

In addition, when the first device obtains the first neural network model, the first device may send a low-density reference signal to the second device, to reduce overheads of sending a reference signal by the second device.

Optionally, before S320, the method 300 may further include: The first device sends fourth indication information to the second device. The fourth indication information is used to indicate the density of the second reference signal, in other words, to indicate that the second reference signal to be sent by the first device is a normal-density reference signal. Correspondingly, after receiving the fourth indication information, the second device receives the second reference signal on the resource used to transmit the normal-density reference signal.

When the first device is a network device, and the second device is a terminal device, the fourth indication information may be carried in DCI. Specifically, the fourth indication information may be an RSDensityFlag field in the DCI. The RSDensityFlag field may be a Boolean (bool) variable. For example, if RSDensityFlag=0, it indicates that the density of the second reference signal is normal density.

When the first device is a terminal device, and the second device is a network device, the fourth indication information may be carried in UCI. Specifically, the fourth indication information may be an RSDensityFlag field in the UCI. The RSDensityFlag field may be a Boolean variable. For example, if RSDensityFlag=0, it indicates that the density of the second reference signal is normal density.

Optionally, before S320, the first device may not send the fourth indication information. In this case, the second device receives, by default, a reference signal from the first device on the resource used to transmit the normal-density reference signal, until the second device receives first indication information from the first device, or until the second device receives, after the second device sends a second request message to the first device, the reference signal from the first device on the resource used to transmit the low-density reference signal. The first indication information is used to indicate the density of the first reference signal. The second request message is used to request the first reference signal, and the second request message is further used to indicate the density of the first reference signal.

Optionally, before S350, the method 300 may further include: The first device sends the first indication information to the second device when training of the neural network is completed. In other words, the first device sends the first indication information to the second device when determining the first neural network model.

The first indication information is used to indicate the density of the first reference signal. In other words, when training of the neural network is completed, the first device may send the first indication information to the second device, to indicate that the first reference signal to be sent by the first device is a low-density reference signal. Correspondingly, after receiving the first indication information, the second device receives the first reference signal on the resource used to transmit the low-density reference signal. As described above, the density of the first reference signal may be equal to the density of the second reference signal. In this case, after receiving the first indication information, the second device obtains the first CSI based on the reference signal received on the resource used to transmit the low-density reference signal.

When the first device is a network device, and the second device is a terminal device, the first indication information may be carried in DCI. Specifically, the first indication information may be an RSDensityFlag field in the DCI. The RSDensityFlag field may be a Boolean variable. For example, if RSDensityFlag=1, it indicates that the density of the first reference signal is low density.

When the first device is a terminal device, and the second device is a network device, the first indication information may be carried in UCI. Specifically, the first indication information may be an RSDensityFlag field in the UCI. The RSDensityFlag field may be a Boolean variable. For example, if RSDensityFlag=1, it indicates that the density of the first reference signal is low density.

Optionally, before S350, the method 300 may further include: The second device sends the second request message to the first device.

The second request message is used to request the first reference signal, and the second request message is further used to indicate the density of the first reference signal. In other words, the second device may send the second request message to the first device, to request a low-density reference signal. Further, after sending the second request message, the second device receives the first reference signal on the resource used to transmit the low-density reference signal. As described above, the density of the first reference signal may be equal to the density of the second reference signal. In this case, after sending the second request message, the second device obtains the first CSI based on the reference signal received on the resource used to transmit the low-density reference signal.

The second device may periodically send the second request message to the first device. Alternatively, when receiving second indication information from the first device, the second device may send the second request message to the first device. The second indication information is used to indicate that the first neural network model is determined.

When the first device is a network device, and the second device is a terminal device, the second request message may be carried in UCI. Specifically, the second request message may be an RSDensity Flag field in the UCI. The RSDensityFlag field may be a Boolean variable. For example, if RSDensityFlag=1, it indicates that the density of the first reference signal is low density.

When the first device is a terminal device, and the second device is a network device, the second request message may be carried in DCI. Specifically, the second request message may be an RSDensity Flag field in the DCI. The RSDensityFlag field may be a Boolean variable. For example, if RSDensityFlag=1, it indicates that the density of the first reference signal is low density.

Optionally, the first device may periodically send the normal-density reference signal (the second reference signal) and the low-density reference signal (the first reference signal). For example, the first device sends the normal-density reference signal in a first period, and correspondingly, the second device receives, in the first period, the reference signal from the first device on the resource used to transmit the normal-density reference signal; and the first device sends the low-density reference signal in a second period, and correspondingly, the second device receives, in the second period, the reference signal from the first device on the resource used to transmit the low-density reference signal.

Optionally, after S380, the method 300 may further include: The first device updates the first neural network model when a preset trigger condition is met.

The step in which the first device updates the first neural network model may include:

- The first device sends the third reference signal to the second device, where the third reference signal is a normal-density reference signal;
- the first device receives fourth CSI from the second device, where the fourth CSI is obtained by the second device based on the third reference signal; and
- the first device trains the neural network based on the fourth CSI, to obtain an updated first neural network model.

For specific description of the step in which the first device updates the first neural network model, refer to the description in S320 to S340. For brevity, details are not described in this embodiment of this application.

It may be understood that after the first device obtains the updated first neural network model, S350 to S370 in the method 300 may continue to be repeatedly performed for a plurality of times based on the duration of communication between the first device and the second device. Therefore, that after S380, the first device updates the first neural network model may alternatively be understood as that after S380, S320 to S370 in the method 300 are performed again when the preset trigger condition is met. In other words, in a process of communication between the first device and the second device, S320 to S370 may be periodically performed for a plurality of times.

The preset trigger condition is not limited in this embodiment of this application.

In an example, the preset trigger condition may be that a first timer expires, and the first timer is started when the first device sends the first reference signal to the second device.

It may alternatively be understood as that the first device periodically updates the first neural network model. For example, if a period in which the first device updates the first neural network model is T, the first device may set a timing time of the first timer to T.

In another example, the preset trigger condition may be that the first device determines that demodulation performance of demodulating the first data by the second device is less than a preset threshold.

As described above, the second device demodulates the first data from the first device based on the first precoding matrix from the first device, and then the second device may feed back result information of demodulating the first data to the first device. After receiving the data demodulation information fed back by the second device, the first device may collect statistics on the demodulation performance of demodulating the first data by the second device, and update the first neural network model when determining that the demodulation performance of demodulating the first data by the second device is less than the preset threshold. For example, the demodulation performance of the first data may be a packet loss rate of the first data. When the packet loss rate of the first data is greater than a preset packet loss rate threshold, it may be determined that the demodulation performance of the first data is less than the preset threshold.

Before updating the first neural network model, in other words, before sending the third reference signal, the first device may further send fifth indication information to the second device. The fifth indication information is used to indicate the density of the third reference signal. For the fifth indication information, refer to the description of the fourth indication information. For brevity, details are not described herein.

In still another example, the preset trigger condition may be that the first device receives a first request message from the second device. The first request message is used to request to update the first neural network model.

As described above, the second device demodulates the first data from the first device based on the first precoding matrix from the first device, and then the second device may collect, based on result information of demodulating the first data, statistics on demodulation performance of demodulating the first data, and sends the second request message to the first device when determining that the demodulation performance of the first data is less than a preset threshold, to request the first device to update the first neural network model. It may alternatively be understood as that the first request message is used to request the third reference signal, in other words, used to request a normal-density reference signal.

Figure 9:
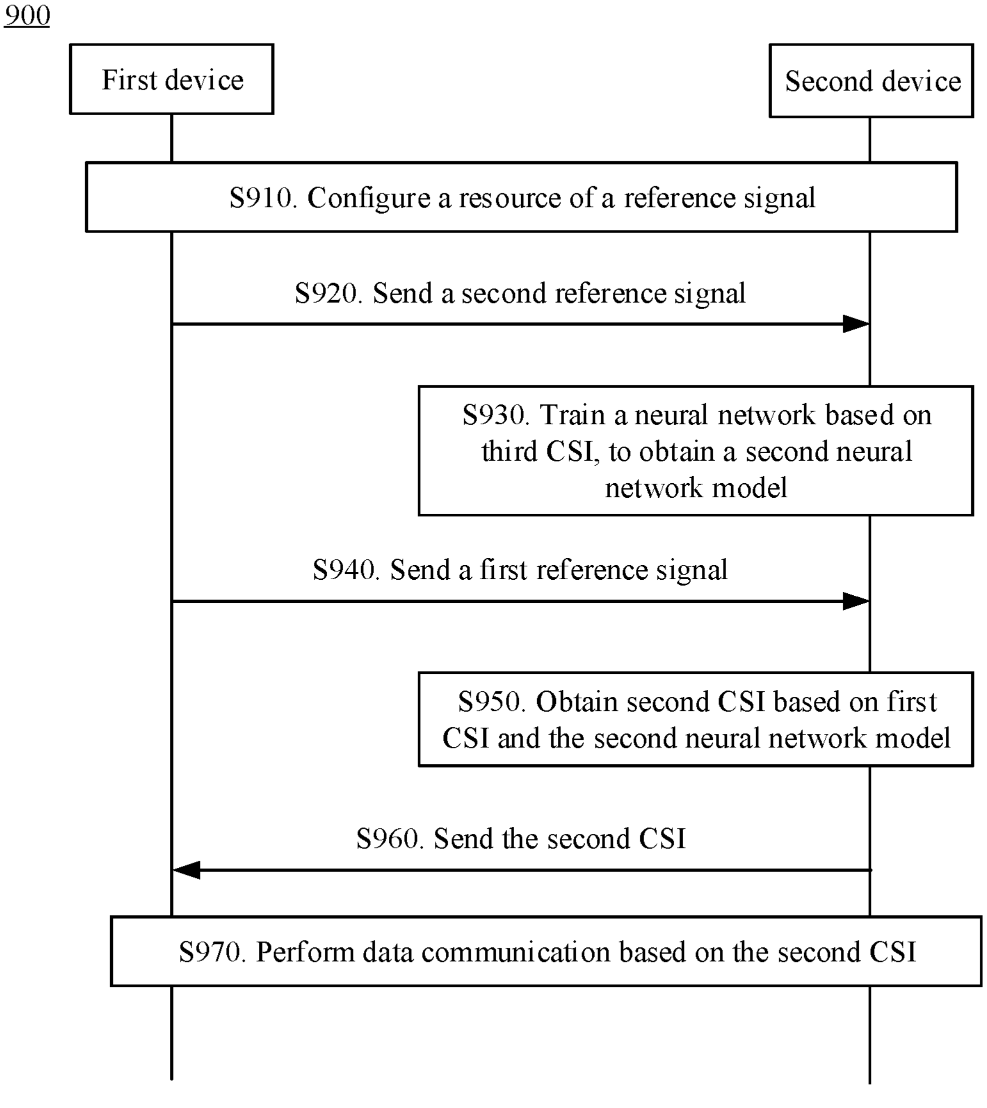
FIG. 9 to FIG. 11 are a schematic flowchart of a method for obtaining channel information according to an embodiment of this application.

FIG. 9 is a schematic flowchart of a method 900 for obtaining channel information according to another embodiment of this application. The method 900 shown in FIG. 9 may include S910 to S970. The steps in the method 900 are described below in detail.

S910. Configure a resource of a reference signal.

Specifically, when a first device is a network device, and a second device is a terminal device, the first device may send configuration information of the reference signal to the second device, to configure, for the second device, a resource used to receive the reference signal.

When a first device is a terminal device, and a second device is a network device, the second device may send configuration information of the reference signal to the first device, to configure, for the first device, a resource used to send the reference signal.

The reference signal may be a CSI-RS, a DMRS, an SRS, or the like. The configuration information of the reference signal may include density information or the like of the reference signal.

The configuration information of the reference signal may be carried in an RRC message. A format of the RRC message provided in this embodiment of the application is described below by using an RRC message used to configure density of a CSI-RS as an example.

The RRC message used to configure the density of the CSI-RS is as follows:

```
--ASN1START
--TAG-CSI-RS-RESOURCEMAPPING-START
CSI-RS-ResourceMapping::=SEQUENCE {
 frequencyDomainAllocation CHOICE {
  row1 BTT STRING (SIZE (4)),
  row2 BTT STRING (SIZE (12)),
  row3 BTT STRING (SIZE (3)),
  other BTT STRING (SIZE (4)),
 },
 nrofPorts ENUMERATED {p1,p2,p4,p8,p12,p16,p32},
 firstOFDMSymbolInTimeDomain INTEGER (0..13),
 firstOFDMSymbolInTimeDomain2 INTEGER (2..12),
OPTIONAL, --Need R
 cdm-Type ENUMERATED {noCDM, fd-CMD2,
cdm4-FD2-TD2, cdm8-FD2-TD4},
 density CHOICE {
   dot5 ENUMERATED {evenPRBs, oddPRBs},
   one NULL,
   three NELL,
   spare NULL
 },
 freqBand CSI-FrequencyOccupation,
 PortDensity CHOICE {
   one NULL,
   half NULL,
   quarter NULL,
   ...
 },
 ...
}
--TAG-CSI-RS-RESOURCEMAPPING-STOP
--ASN1STOP
```

Density", and this should constitute no limitation on this embodiment of this application.

It should be further understood that in the foregoing description, the format of the RRC message used to configure the CSI-RS is merely used as an example for description, and this should constitute no limitation on this embodiment of this application. In this embodiment of this application, a PortDensity field may be newly added to an RRC message used to configure a DMRS, to configure a low-density DMRS. Alternatively, in this embodiment of this application, a PortDensity field may be newly added to an RRC message used to configure an SRS, to configure a low-density SRS.

It should be further understood that in the foregoing description, that the PortDensity field includes three options "one", "half", and "quarter" is merely used as an example for description, and this should constitute no limitation on this embodiment of this application. For example, the PortDensity field may further include options such as "one third" and "one eighth".

Based on the format of the RRC message provided in this embodiment of this application, resources of CSI-RSs with two types of densities may be configured at a time. Density indicated in the density CHOICE field is normal density, namely, density of a reference signal defined in a current NR protocol, namely, density of a second reference signal or a third reference signal mentioned below. Density indicated in the PortDensity field is low density in this embodiment of this application, namely, density of a first reference signal mentioned below. Each option in the PortDensity field represents a proportion of the low density to the normal density. For example, "one" represents that the low density is equal to the normal density, "half" represents that the low density is ½ of the normal density, and "quarter" represents that the low density is ¼ of the normal density.

It should be understood that in this embodiment of this application, it is merely an example to name a field used to configure density of a low-density reference signal "PortDensity", and this should constitute no limitation on this embodiment of this application.

The density of the low-density reference signal is not limited in this embodiment of this application. Specifically, in different application scenarios, the network device may send different RRC messages to the terminal device, to configure resources of low-density reference signals with different density.

In an example, when there is a relatively stable channel between the network device and the terminal device (for example, the terminal device is indoors, the terminal device remains stationary, or the terminal device moves slowly), the network device may configure a low-density reference signal with relatively low density. For example, the network device may configure a low-density reference signal whose density is ¼ of the normal density. In this case, an RRC message sent by the network device to the terminal device may be as follows:

```
... ...
PortDensity CHOICE {
 quarter NULL
},
... ...
```

In another example, when there is an unstable channel between the network device and the terminal device (for example, the terminal device moves quickly), the network device may configure a low-density reference signal with relatively high density. For example, the network device may configure a low-density reference signal whose density is ½ of the normal density. In this case, an RRC message sent by the network device to the terminal device may be as follows:

```
... ...
PortDensity CHOICE {
 half NULL
},
... ...
```

S920. The first device sends the second reference signal to the second device. Correspondingly, in S920, the second device receives the second reference signal from the first device.

When the first device is a network device, and the second device is a terminal device, the second reference signal may be a CSI-RS or a DMRS.

When the first device is a terminal device, and the second device is a network device, the second reference signal may be a DMRS or an SRS.

Specifically, the first device sends the second reference signal by using the normal density configured in the RRC message. The normal density is the density of the reference signal defined in the current NR protocol. The density of the reference signal refers to a percentage of a quantity of resources used to transmit the reference signal in a total quantity of transmission resources. That the first device sends the second reference signal by using the normal density may mean that a quantity of transmit ports used by the network device to send the second reference signal is equal to a quantity of transmit ports of the reference signal defined in the current NR protocol. For example, if the second reference signal is a 32-port CSI-RS, when the first device sends the 32-port CSI-RS based on the normal density, a quantity of transmit ports used by the first device is 32.

S930. The second device trains a neural network based on third CSI, to obtain a second neural network model.

The third CSI is obtained by the second device based on the second reference signal.

A specific manner in which the second device trains the neural network is not limited in this embodiment of this application.

In an example, the neural network may be trained by using channel data and a method for fusing and embedding features of the channel data in a plurality of domains.

As shown in FIG. 4, a CFR (for example, a CFR a to a CFR h shown in FIG. 4) obtained based on a reference signal is used as input data; further, a CFR value may be represented by a vector, and each channel feature of the CFR may also be represented by a vector; and further, the embedding vectors of the CFR and the channel feature of the CFR are added and calculated in the neural network as a fusion result, to train the neural network.

As shown in FIG. 4, in addition to the CFR, the input data may further include special marks such as [CLS] and [SEP], [CLS] is used to classify CFRs and the like in a subsequent downstream task, and [SEP] is used to separate CFRs in different domains.

In addition to embedding of the channel data, there may further be location embedding. For example, if the channel data is not input to the neural network in a form of a sequence, but is input to the neural network in parallel, there needs to be an embedding vector (for example, location embedding vectors $E_{P0}$ to $E_{P12}$ shown in FIG. 4) for each location, so that the neural network can learn of a location relationship between channel data inputs.

The features of the channel data in a plurality of domains may include a frequency feature, a time feature, a spatial feature, and the like. The frequency feature may represent a frequency feature related to a frequency, a subcarrier, or the like. For example, $E_{F1}$ and $E_{F2}$ shown in FIG. 4 may respectively represent frequency embedding vectors related to two different subcarriers. The time feature may be a time feature related to time, a time offset, or the like. For example, $E_{T0}$ and $E_{T1}$ shown in FIG. 4 may respectively represent time embedding vectors related to two different subframes. The spatial feature is represented by an antenna difference in terms of channel data, and may represent an antenna-related feature. For example, $E_{A0}$ and $E_{A1}$ shown in FIG. 4 may respectively represent antenna embedding vectors related to two different receive antennas or two different transmit antennas.

Specifically, the second device uses a part of the third CSI as input data of training the neural network, and the second device may determine, based on the density of the low-density reference signal configured in the RRC message, a size of the CSI used as the input data.

For example, when the density of the low-density reference signal configured in the RRC message is ½ of the normal density, the second device uses ½ of the third CSI as the input data of training the neural network.

For another example, when the density of the low-density reference signal configured in the RRC message is ¼ of the normal density, the second device uses ¼ of the third CSI as the input data of training the neural network.

Further, the second device compares an output result of the neural network with the third CSI. When a difference between the output result and the third CSI is less than a preset threshold, it is considered that training of the neural network is completed, in other words, the second neural network model is obtained.

It should be understood that when the difference between the output result of the neural network and the third CSI is greater than or equal to the preset threshold, it is considered that training of the neural network is not completed. In this case, S920 and S930 in the method 900 continue to be performed, until the difference between the output result of the neural network and the third CSI is less than the preset threshold, and in this case, S940 to S960 in the method 900 are performed.

S940. The first device sends the first reference signal to the second device. Correspondingly, in S940, the second device receives the first reference signal from the first device.

The density of the first reference signal is less than the density of the second reference signal.

When the first device is a network device, and the second device is a terminal device, the first reference signal may be a CSI-RS or a DMRS.

When the first device is a terminal device, and the second device is a network device, the first reference signal may be a DMRS or an SRS.

Specifically, the first device sends the first reference signal by using the low density configured in the RRC message. The low density is density less than the normal density. That the first device sends the first reference signal by using the low density means that a quantity of transmit ports used by the first device to send the first reference signal is less than the quantity of transmit ports of the reference signal defined in the current NR protocol. For example, if the first reference signal is a 32-port CSI-RS, when the first device sends the 32-port CSI-RS based on the low density, a quantity of transmit ports used by the first device is less than 32.

The density of the first reference signal configured in the RRC message is not limited in this embodiment of this application. As described above, in different application scenarios, the network device may send different RRC messages to configure first reference signals with different density.

In an example, the density of the first reference signal may be ½ of the density of the second reference signal. In other words, the quantity of transmit ports used by the first device to send the first reference signal is ½ of the quantity of transmit ports used to send the second reference signal. For example, when the second reference signal and the first reference signal are 32-port CSI-RSs, the quantity of transmit ports used by the first device to send the second reference signal is 32, and the quantity of transmit ports used to send the first reference signal is 16.

In another example, the density of the first reference signal may be ¼ of the density of the second reference signal. In other words, the quantity of transmit ports used by the first device to send the first reference signal is ¼ of the quantity of transmit ports used to send the second reference signal. For example, when the second reference signal and the first reference signal are 32-port CSI-RSs, the quantity of transmit ports used by the first device to send the second reference signal is 32, and the quantity of transmit ports used to send the first reference signal is 8.

A placement location of the first reference signal on a radio transmission resource is not limited in this embodiment of this application. In other words, the transmit port used by the first device to send the first reference signal is not limited in this embodiment of this application.

In this embodiment of this application, the placement location of the first reference signal may be configured as a part of a placement location of the second reference signal. In other words, the first device may send the first reference signal by using some of transmit ports used to send the second reference signal. For example, when the second reference signal and the first reference signal are 32-port CSI-RSs, if the transmit ports used by the first device to send the second reference signal are a port #1 to a port #32, the first device may send the first reference signal by using some of the port #1 to the port #32. For example, if the density of the first reference signal is ½ of the density of the second reference signal, the first device may send the first reference signal by using 16 ports in the port #1 to the port #32. For example, the first device may send the first reference signal by using the port #1 to a port #16, or may send the first reference signal by using a port #17 to the port #32.

Several examples of the placement location of the first reference signal on the radio transmission resource are provided below by using an example in which the second reference signal and the first reference signal are 32-port CSI-RSs and with reference to FIG. 5 to FIG. 8. CSI-RSs of different ports are mapped and sent in a resource multiplexing manner in which time division, frequency division, and code division are combined. For example, in FIG. 5 to FIG. 8, grids with different filling patterns represent placement locations of CSI-RSs of different ports in two dimensions, namely, a time dimension and a frequency dimension. A required CSI-RS placement resource may be obtained with reference to code division multiplexing. For example, (a) in FIG. 5 is used, and a 16-port CSI-RS needs to be carried. There are grids with eight different filling patterns in the figure, and each filling pattern occupies two grids, in other words, occupies two resource elements (Resource Element, RE). Two codewords (for example, [1, 1] and [1, −1]) with a length of 2 are used on two REs with a same filling pattern, to implement code division multiplexing. Therefore, REs occupied by the eight filling patterns may carry a total of 16 CSI-RSs.

FIG. 5 and FIG. 6 show examples that are of the placement location of the first reference signal and that exist when the density of the first reference signal is ½ of the density of the second reference signal. When the density of the first reference signal is ½ of the density of the second reference signal, the first reference signal needs to carry 16 ports. Therefore, a placement location of a 16-port CSI-RS with the normal density may be directly used for the placement location of the first reference signal, for example, (a) in FIG. 5 and (b) in FIG. 5.

As shown in FIG. 6, the placement location of the first reference signal may be any half of a placement location of a 32-port CSI-RS with the normal density. For example, the placement location of the first reference signal shown in each of (a) and (b) in FIG. 6 is a half of the placement location of the 32-port CSI-RS shown in (a) in FIG. 2, the placement location of the first reference signal shown in (c) in FIG. 6 is a half of the placement location of the 32-port CSI-RS shown in (b) in FIG. 2, and the placement location of the first reference signal shown in (d) in FIG. 6 is a half of the placement location of the 32-port CSI-RS shown in (c) in FIG. 2.

FIG. 7 and FIG. 8 show examples that are of the placement location of the first reference signal and that exist when the density of the first reference signal is ¼ of the density of the second reference signal. When the density of the first reference signal is ¼ of the density of the second reference signal, the first reference signal needs to carry eight ports. Therefore, a placement location of an 8-port CSI-RS with the normal density may be directly used for the placement location of the first reference signal, for example, (a), (b), and (c) in FIG. 7.

As shown in FIG. 8, the placement location of the first reference signal may alternatively be any ¼ of a placement location of a 32-port CSI-RS with the normal density. For example, the placement location of the first reference signal shown in each of (a) and (b) in FIG. 8 is ¼ of the placement location of the 32-port CSI-RS shown in (a) in FIG. 2, the placement location of the first reference signal shown in (c) in FIG. 8 is ¼ of the placement location of the 32-port CSI-RS shown in (b) in FIG. 2, and the placement location of the first reference signal shown in (d) in FIG. 8 is ¼ of the placement location of the 32-port CSI-RS shown in (c) in FIG. 2.

S950. The second device obtains second CSI based on first CSI and the second neural network model.

The first CSI is obtained by the second device based on the first reference signal. It may be understood that in this case, the density of the first reference signal is less than the density of the second reference signal, and therefore a size of the first CSI obtained by the second device based on the first reference signal is less than a size of the third CSI obtained based on the second reference signal. In other words, when the third CSI obtained by the second device based on the second reference signal represents all channel information between the first device and the second device, the first CSI obtained by the second device based on the first reference signal represents some channel information between the first device and the second device.

Further, the second device obtains the second CSI based on the first CSI and the second neural network model.

The second CSI is used to indicate channel information between the first device and the second device.

Specifically, the second device may input the first CSI to the second neural network model as input data, to obtain the second CSI.

S960. The second device sends the second CSI to the first device. Correspondingly, in S960, the first device receives the second CSI from the second device.

S970. The first device performs data communication with the second device based on the second CSI.

Specifically, the first device may calculate a precoding matrix based on the second CSI, and send the precoding matrix to the second device. Further, the first device sends first data to the second device by using the precoding matrix. Correspondingly, after receiving the first data from the first device, the second device demodulates the first data by using the precoding matrix.

Specifically, S940, S950, and S960 may be repeated for a plurality of times based on duration of communication between the first device and the second device, in other words, three operations of sending the first reference signal by the first device, obtaining the second CSI by the second device based on the first CSI and the second neural network model, and feeding back the second CSI by the second device are repeated for a plurality of times.

In this embodiment of this application, the neural network is deployed on a side of the second device, and the neural network is trained based on some channel information in all the channel information (the third CSI), to obtain the second neural network model, so that the second device may restore all the channel information (the second CSI) based on the some channel information (the first CSI) and the second neural network model. Therefore, when the second device obtains a first neural network model, the first device may send a low-density reference signal to the second device, to reduce overheads of sending a reference signal.

Optionally, before S920, the method 900 may further include: The first device sends fourth indication information to the second device. The fourth indication information is used to indicate the density of the second reference signal, in other words, to indicate that the second reference signal to be sent by the first device is a normal-density reference signal. Correspondingly, after receiving the fourth indication information, the second device receives the second reference signal on a resource used to transmit the normal-density reference signal.

When the first device is a network device, and the second device is a terminal device, the fourth indication information may be carried in DCI. Specifically, the fourth indication information may be an RSDensity Flag field in the DCI. The RSDensityFlag field may be a Boolean variable. For example, if RSDensityFlag=0, it indicates that the density of the second reference signal is normal density.

When the first device is a terminal device, and the second device is a network device, the fourth indication information may be carried in UCI. Specifically, the fourth indication information may be an RSDensityFlag field in the UCI. The RSDensityFlag field may be a Boolean variable. For example, if RSDensityFlag=0, it indicates that the density of the second reference signal is normal density.

Optionally, before S920, the first device may not send the fourth indication information. In this case, the second device receives, by default, a reference signal from the first device on the resource used to transmit the normal-density reference signal, until the second device receives first indication information from the first device, or until the second device receives, after the second device sends a second request message to the first device, the reference signal from the first device on a resource used to transmit the low-density reference signal. The first indication information is used to indicate the density of the first reference signal. The second request message is used to request the first reference signal, and the second request message is further used to indicate the density of the first reference signal.

Optionally, before S940, the method 900 may further include: The first device sends first indication information to the second device.

The first indication information is used to indicate the density of the first reference signal. In other words, when training of the neural network is completed, the first device may send the first indication information to the second device, to indicate that the first reference signal to be sent by the first device is a low-density reference signal. Correspondingly, after receiving the first indication information, the second device receives the first reference signal on the resource used to transmit the low-density reference signal. As described above, the density of the first reference signal may be equal to the density of the second reference signal. In this case, after receiving the first indication information, the second device obtains the first CSI based on a reference signal received on the resource used to transmit the low-density reference signal.

The first device may periodically send the first indication information to the second device. Alternatively, when receiving third indication information from the second device, the first device may send the first indication information to the second device. The third indication information is used to indicate that the second neural network model is determined.

When the first device is a network device, and the second device is a terminal device, the first indication information may be carried in DCI. Specifically, the first indication information may be an RSDensityFlag field in the DCI. The RSDensityFlag field may be a Boolean variable. For example, if RSDensityFlag=1, it indicates that the density of the first reference signal is low density.

When the first device is a terminal device, and the second device is a network device, the first indication information may be carried in UCI. Specifically, the first indication information may be an RSDensityFlag field in the UCI. The RSDensityFlag field may be a Boolean variable. For example, if RSDensityFlag=1, it indicates that the density of the first reference signal is low density.

Optionally, before S940, the method 900 may further include: The second device sends the second request message to the first device.

The second request message is used to request the first reference signal, and the second request message is further used to indicate the density of the first reference signal. In other words, the second device may send the second request message to the first device, to request a low-density reference signal. Further, after sending the second request message, the second device receives the first reference signal on the resource used to transmit the low-density reference signal. As described above, the density of the first reference signal may be equal to the density of the second reference signal. In this case, after sending the second request message, the second device obtains the first CSI based on a reference signal received on the resource used to transmit the low-density reference signal.

When the first device is a network device, and the second device is a terminal device, the second request message may be carried in UCI. Specifically, the second request message may be an RSDensity Flag field in the UCI. The RSDensityFlag field may be a Boolean variable. For example, if RSDensityFlag=1, it indicates that the density of the first reference signal is low density.

When the first device is a terminal device, and the second device is a network device, the second request message may be carried in DCI. Specifically, the second request message may be an RSDensity Flag field in the DCI. The RSDensityFlag field may be a Boolean variable. For example, if RSDensityFlag=1, it indicates that the density of the first reference signal is low density.

Optionally, the first device may periodically send the normal-density reference signal (the second reference signal) and the low-density reference signal (the first reference signal). For example, the first device sends the normal-density reference signal in a first period, and correspondingly, the second device receives, in the first period, the reference signal from the first device on the resource used to transmit the normal-density reference signal; and the first device sends the low-density reference signal in a second period, and correspondingly, the second device receives, in the second period, the reference signal from the first device on the resource used to transmit the low-density reference signal.

Optionally, after S970, the method 900 may further include: The second device updates the second neural network model when a preset trigger condition is met.

The step in which the second device updates the second neural network model may include:

- The first device sends the third reference signal to the second device, where the third reference signal is a normal-density reference signal; and
- the second device trains the neural network based on fourth CSI, to obtain an updated second neural network model, where the fourth CSI is obtained based on the third reference signal.

For specific description of the step in which the second device updates the second neural network model, refer to the description in S920 and S930. For brevity, details are not described in this embodiment of this application.

It may be understood that after the second device obtains the updated second neural network model, S940 to S960 in the method 900 may continue to be repeatedly performed for a plurality of times based on the duration of communication between the first device and the second device. Therefore, that after S970, the second device updates the second neural network model may alternatively be understood as that after S970, S920 to S960 in the method 900 are performed again when the preset trigger condition is met. In other words, in a process of communication between the first device and the second device, S920 to S960 may be periodically performed for a plurality of times.

The preset trigger condition is not limited in this embodiment of this application.

In an example, the preset trigger condition may be that a second timer expires, and the second timer is started when the second device receives the first reference signal from the first device.

It may alternatively be understood as that the second device periodically updates the second neural network model. For example, if a period in which the second device updates the second neural network model is T, the second device may set a timing time of the second timer to T.

In another example, the preset trigger condition may be that the second device determines that demodulation performance of demodulating the first data is less than a preset threshold.

As described above, the second device demodulates the first data from the first device based on the precoding matrix from the first device, and then the second device may collect, based on result information of demodulating the first data, statistics on the demodulation performance of demodulating the first data, and update the second neural network model when determining that the demodulation performance of the first data is less than the preset threshold. For example, the demodulation performance of the first data may be a packet loss rate of the first data. When the packet loss rate of the first data is greater than a preset packet loss rate threshold, it may be determined that the demodulation performance of the first data is less than the preset threshold.

Before updating the second neural network model, in other words, before receiving the third reference signal from the first device, the second device may further send a first request message to the second device. The first request message is used to request the third reference signal, in other words, used to request a normal-density reference signal.

The method for obtaining channel information provided in the embodiments of this application is described below with reference to FIG. 10 and FIG. 11 and by using an example in which a first device is a network device, a second device is a terminal device, and a second reference signal and a first reference signal are 32-port CSI-RSs.

Figure 10:
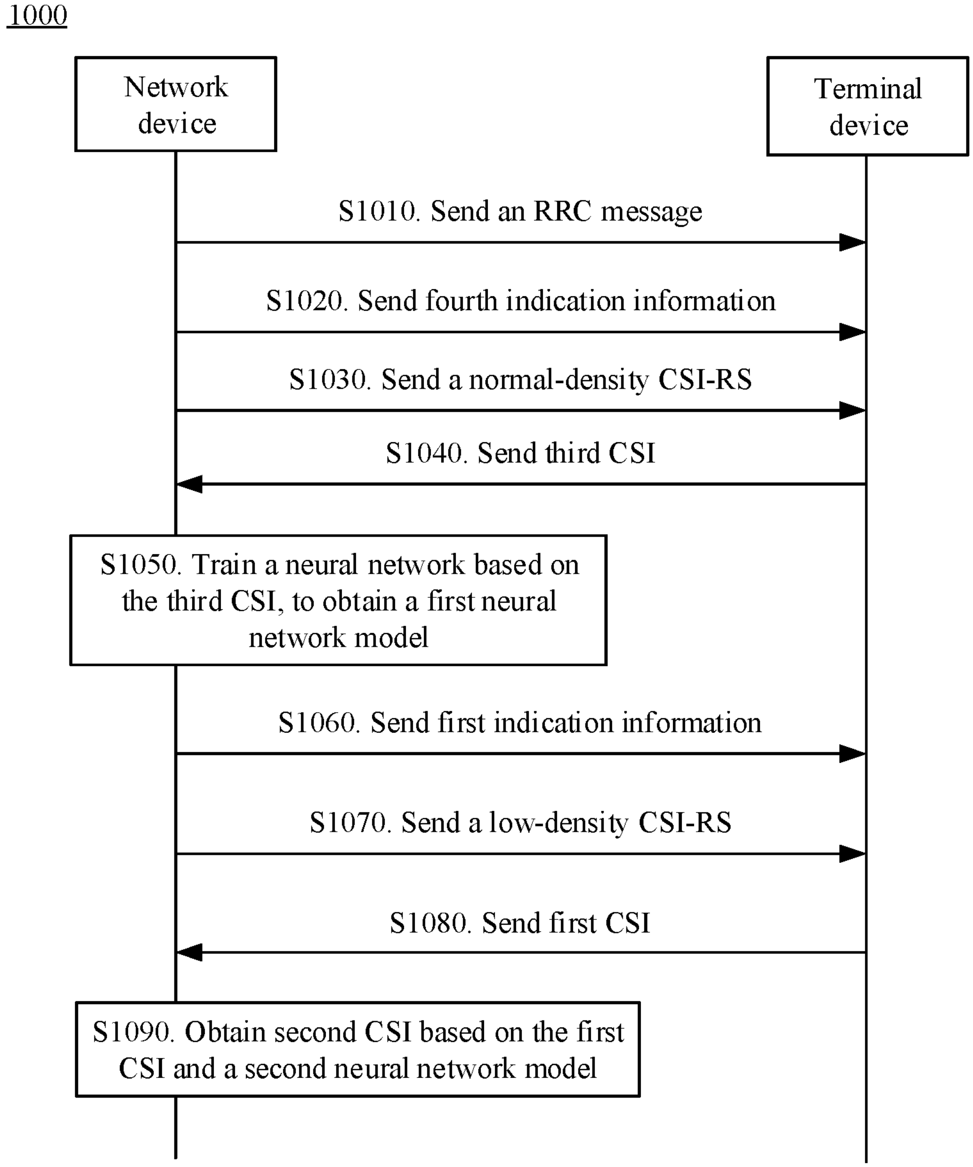

In a method shown in FIG. 10, description is provided by using an example in which a neural network is deployed on a side of a network device. As shown in FIG. 10, the method 1000 may include S1010 to S1090. The steps are described below in detail.

S1010. The network device sends an RRC message to a terminal device. Correspondingly, in S1010, the terminal device receives the RRC message from the network device.

The RRC message may be used to configure resources used to transmit a normal-density CSI-RS (an example of a second reference signal) and a low-density CSI-RS (an example of a first reference signal), for example, may be used to configure density of the normal-density CSI-RS and density of the low-density CSI-RS. For a format of the RRC message, refer to the description in S310. For brevity, details are not described in this embodiment of this application.

S1020. The network device sends fourth indication information to the terminal device. Correspondingly, in S1020, the terminal device receives the fourth indication information from the network device.

The fourth indication information is used to indicate that a CSI-RS to be sent by the network device is a normal-density CSI-RS. Correspondingly, after receiving the fourth indication information, the terminal device receives the CSI-RS on the resource used to transmit the normal-density CSI-RS.

The fourth indication information may be carried in DCI. Specifically, the fourth indication information may be an RSDensityFlag field in the DCI. The RSDensityFlag field may be a Boolean variable. For example, if RSDensityFlag=0, it indicates that the CSI-RS to be sent by the network device is a normal-density CSI-RS.

S1030. The network device sends the normal-density CSI-RS to the terminal device. Correspondingly, in S1030, the terminal device receives the normal-density CSI-RS from the network device.

Specifically, the network device sends the normal-density CSI-RS by using normal density configured in the RRC message. For example, if the CSI-RS to be sent by the network device is a 32-port CSI-RS, when the network device sends the 32-port CSI-RS based on the normal density, a quantity of transmit ports used by the network device is 32.

S1040. The terminal device sends third CSI to the network device. Correspondingly, in S1040, the network device receives the third CSI from the terminal device.

The third CSI is obtained by the terminal device based on the normal-density CSI-RS. For a manner in which the terminal device obtains the third CSI based on the normal-density CSI-RS, refer to the conventional technology. For brevity, details are not described in this embodiment of this application.

S1050. The network device trains the neural network based on the third CSI, to obtain a first neural network model.

For a method for training the neural network by the network device, refer to the description in S340. For brevity, details are not described in this embodiment of this application.

S1060. When obtaining the first neural network model, the network device sends first indication information to the terminal device. Correspondingly, in S1060, the terminal device receives the first indication information from the network device.

The first indication information is used to indicate that a CSI-RS to be sent by the network device is a low-density CSI-RS. Correspondingly, after receiving the first indication information, the terminal device receives the CSI-RS on the resource used to transmit the low-density CSI-RS.

The first indication information may be carried in DCI. Specifically, the first indication information may be an RSDensityFlag field in the DCI. The RSDensityFlag field may be a Boolean variable. For example, if RSDensityFlag=1, it indicates that the CSI-RS to be sent by the network device is a low-density CSI-RS.

S1070. The network device sends the low-density CSI-RS to the terminal device. Correspondingly, in S1070, the terminal device receives the low-density CSI-RS from the network device.

Specifically, the network device sends the low-density CSI-RS by using low density configured in the RRC message. For example, if the network device is to send a 32-port CSI-RS, when the network device sends the 32-port CSI-RS based on the low density, a quantity of transmit ports used by the network device is less than 32.

The density of the low-density CSI-RS and a placement location on a radio resource are not limited in this embodiment of this application. For details, refer to the description in S350. For brevity, details are not described in this embodiment of this application.

S1080. The terminal device sends first CSI to the network device. Correspondingly, in S1080, the network device receives the first CSI from the terminal device.

The first CSI is obtained by the terminal device based on the low-density CSI-RS. It may be understood that in this case, the density of the low-density CSI-RS is less than the density of the normal-density CSI-RS, and therefore a size of the first CSI obtained by the terminal device based on the low-density CSI-RS is less than a size of the third CSI obtained based on the normal-density CSI-RS. In other words, when the third CSI obtained by the terminal device based on the normal-density CSI-RS represents all downlink channel information, the first CSI obtained by the terminal device based on the low-density CSI-RS represents some downlink channel information.

Further, the terminal device sends the obtained first CSI to the network device.

S1090. The network device obtains second CSI based on the first CSI and the first neural network model.

The second CSI is used to indicate downlink channel information between the network device and the terminal device.

Specifically, the network device may input the first CSI to the first neural network model as input data, to obtain the second CSI.

Figure 11:
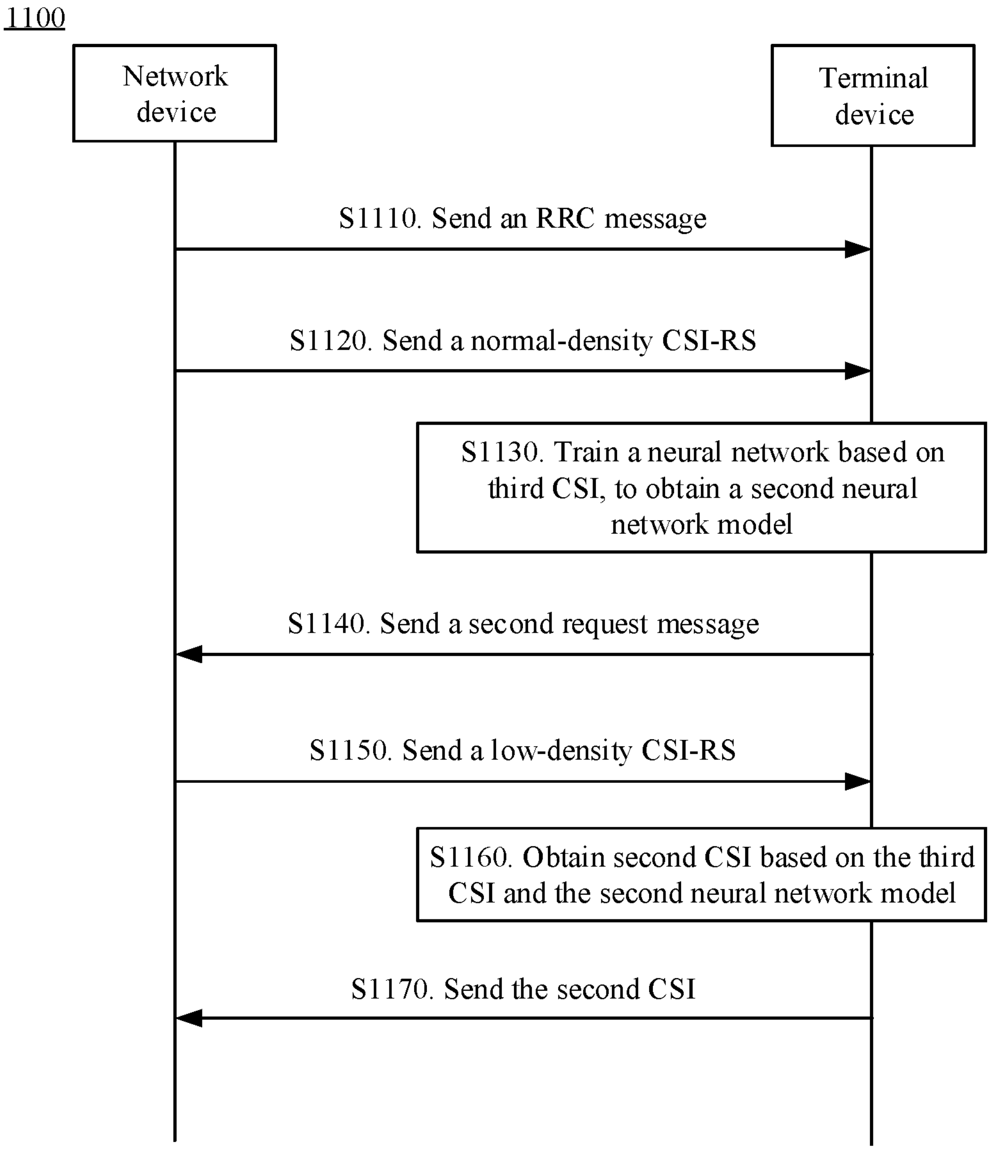

In a method shown in FIG. 11, description is provided by using an example in which a neural network is deployed on a side of a terminal device. As shown in FIG. 11, the method 1100 may include S1110 to S1170. The steps are described below in detail.

S1110. A network device sends an RRC message to the terminal device. Correspondingly, in S1110, the terminal device receives the RRC message from the network device.

The RRC message may be used to configure resources used to transmit a normal-density CSI-RS (an example of a second reference signal) and a low-density CSI-RS (an example of a first reference signal), for example, may be used to configure density of the normal-density CSI-RS and density of the low-density CSI-RS. For a format of the RRC message, refer to the description in S310. For brevity, details are not described in this embodiment of this application.

S1120. The network device sends the normal-density CSI-RS to the terminal device. Correspondingly, in S1120, the terminal device receives the normal-density CSI-RS from the network device.

Specifically, the network device sends the normal-density CSI-RS by using normal density configured in the RRC message. For example, if the CSI-RS to be sent by the network device is a 32-port CSI-RS, when the network device sends the 32-port CSI-RS based on the normal density, a quantity of transmit ports used by the network device is 32.

S1130. The terminal device trains the neural network based on third CSI, to obtain a second neural network model.

The third CSI is obtained by the terminal device based on the normal-density CSI-RS. For a manner in which the terminal device obtains the third CSI based on the normal-density CSI-RS, refer to the conventional technology. For brevity, details are not described in this embodiment of this application.

For a method for training the neural network by the network device, refer to the description in S340. For brevity, details are not described in this embodiment of this application.

S1140. When obtaining the second neural network model, the terminal device sends a second request message to the network device. Correspondingly, in S1140, the network device receives the second request message from the terminal device.

The second request message is used to request a low-density CSI-RS. In other words, after sending the second request message to the network device, the terminal device receives the low-density CSI-RS on the resource used to transmit the low-density CSI-RS.

The second request message may be carried in UCI. Specifically, the second request message may be an RSDensityFlag field in the UCI. The RSDensityFlag field may be a Boolean variable. For example, if RSDensityFlag=1, it indicates that the terminal device requests a low-density CSI-RS.

S1150. The network device sends the low-density CSI-RS to the terminal device. Correspondingly, in S1150, the terminal device receives the low-density CSI-RS from the network device.

Specifically, the network device sends the low-density CSI-RS by using low density configured in the RRC message. For example, if the network device is to send a 32-port CSI-RS, when the network device sends the 32-port CSI-RS based on the low density, a quantity of transmit ports used by the network device is less than 32.

The density of the low-density CSI-RS and a placement location on a radio resource are not limited in this embodiment of this application. For details, refer to the description in S350. For brevity, details are not described in this embodiment of this application.

S1160. The terminal device obtains second CSI based on first CSI and the second neural network model.

The first CSI is obtained by the terminal device based on the low-density CSI-RS. It may be understood that in this case, the density of the low-density CSI-RS is less than the density of the normal-density CSI-RS, and therefore a size of the first CSI obtained by the terminal device based on the low-density CSI-RS is less than a size of the third CSI obtained based on the normal-density CSI-RS. In other words, when the third CSI obtained by the terminal device based on the normal-density CSI-RS represents all downlink channel information, the first CSI obtained by the terminal device based on the low-density CSI-RS represents some downlink channel information.

Further, the network device may input the first CSI to a first neural network model as input data, to obtain the second CSI.

The second CSI is used to indicate downlink channel information between the network device and the terminal device.

S1170. The terminal device sends the second CSI to the network device. Correspondingly, in S1170, the network device receives the second CSI from the terminal device.

The method in the embodiments of this application is described above in detail with reference to FIG. 3 to FIG. 11. An apparatus in the embodiments of this application is described below in detail with reference to FIG. 12 to FIG. 15. It should be noted that the apparatus shown in FIG. 12 to FIG. 15 may implement the steps in the foregoing method. For brevity, details are not described herein.

Figure 12:
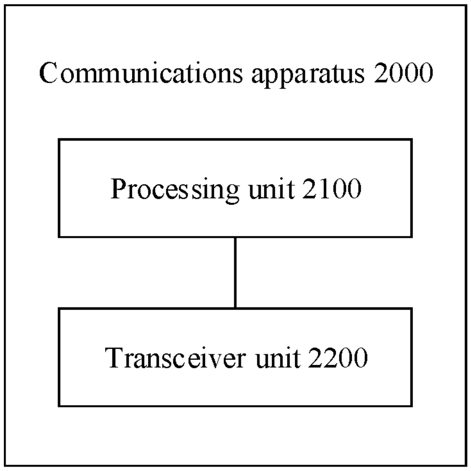
FIG. 12 is a schematic block diagram of a communications apparatus according to an embodiment of this application.

FIG. 12 is a schematic block diagram of a communications apparatus according to an embodiment of this application. As shown in FIG. 12, the communications apparatus 2000 may include a processing unit 2100 and a transceiver unit 2200.

In a possible design, the communications apparatus 2000 may correspond to the first device in the foregoing method embodiments, for example, may be a first device or a component (for example, a chip or a chip system) disposed in a first device.

It should be understood that the communications apparatus 2000 may correspond to the first device in the method 300 and the method 900 according to the embodiments of this application. The communications apparatus 2000 may include a unit configured to perform the method performed by the first device in the method 300 in FIG. 3 and the method 900 in FIG. 9. In addition, the units in the communications apparatus 2000 and the foregoing other operations and/or functions are respectively used to implement the corresponding procedures of any one of the method 300 in FIG. 3 and the method 900 in FIG. 9. It should be understood that a specific process in which the units perform the foregoing corresponding steps has been described in detail in the foregoing method embodiments. For brevity, details are not described herein again.

In another possible design, the communications apparatus 2000 may correspond to the second device in the foregoing method embodiments, for example, may be a second device or a component (for example, a chip or a chip system) disposed in a second device.

It should be understood that the communications apparatus 2000 may correspond to the second device in the method 300 and the method 900 according to the embodiments of this application. The communications apparatus 2000 may include a unit configured to perform the method performed by the second device in the method 300 in FIG. 3 and the method 900 in FIG. 9. In addition, the units in the communications apparatus 2000 and the foregoing other operations and/or functions are respectively used to implement the corresponding procedures of any one of the method 300 in FIG. 3 and the method 900 in FIG. 9. It should be understood that a specific process in which the units perform the foregoing corresponding steps has been described in detail in the foregoing method embodiments. For brevity, details are not described herein again.

In still another possible design, the communications apparatus 2000 may correspond to the terminal device in the foregoing method embodiments, for example, may be a terminal device or a component (for example, a chip or a chip system) disposed in a terminal device.

It should be understood that the communications apparatus 2000 may correspond to the terminal device in the method 1000 and the method 1100 according to the embodiments of this application. The communications apparatus 2000 may include a unit configured to perform the method performed by the terminal device in the method 1000 in FIG. 10 and the method 1100 in FIG. 11. In addition, the units in the communications apparatus 2000 and the foregoing other operations and/or functions are respectively used to implement the corresponding procedures of any one of the method 1000 in FIG. 10 and the method 1100 in FIG. 11. It should be understood that a specific process in which the units perform the foregoing corresponding steps has been described in detail in the foregoing method embodiments. For brevity, details are not described herein again.

It should be further understood that when the communications apparatus 2000 is a chip disposed in a terminal device, the transceiver unit 2200 in the communications apparatus 2000 may be implemented by using an input/output interface, and the processing unit 2100 in the communications apparatus 2000 may be implemented by using a processor, a microprocessor, an integrated circuit, or the like integrated into the chip or a chip system.

In still another possible design, the communications apparatus 2000 may correspond to the network device in the foregoing method embodiments, for example, may be a network device or a component (for example, a chip or a chip system) disposed in a network device.

It should be understood that the communications apparatus 2000 may correspond to the network device in the method 1000 and the method 1100 according to the embodiments of this application. The communications apparatus 2000 may include a unit configured to perform the method performed by the network device in the method 1000 in FIG. 10 and the method 1100 in FIG. 11. In addition, the units in the communications apparatus 2000 and the foregoing other operations and/or functions are respectively used to implement the corresponding procedures of any one of the method 1000 in FIG. 10 and the method 1100 in FIG. 11. It should be understood that a specific process in which the units perform the foregoing corresponding steps has been described in detail in the foregoing method embodiments. For brevity, details are not described herein again.

It should be further understood that when the communications apparatus 2000 is a chip disposed in a network device, the transceiver unit 2200 in the communications apparatus 2000 may be implemented by using an input/output interface, and the processing unit 2100 in the communications apparatus 2000 may be implemented by using a processor, a microprocessor, an integrated circuit, or the like integrated into the chip or a chip system.

Figure 13:
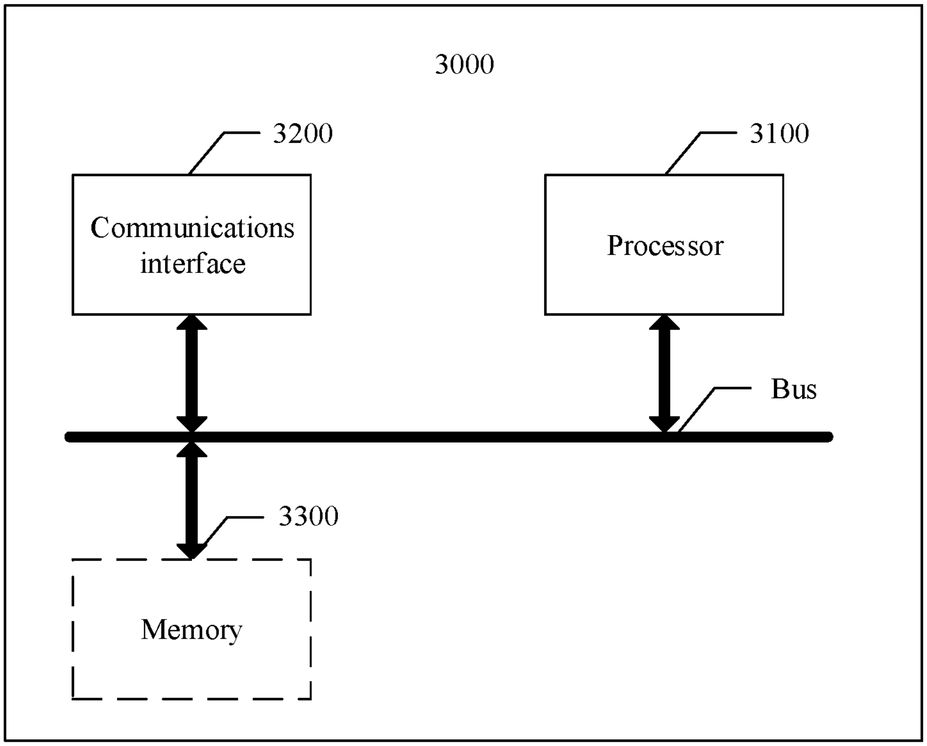
FIG. 13 is a schematic diagram of a structure of a communications apparatus according to another embodiment of this application.

FIG. 13 is a schematic diagram of a structure of a communications apparatus 3000 according to an embodiment of this application. As shown in FIG. 13, the communications apparatus 3000 includes a processor 3100 and a communications interface 3200. Optionally, the communications apparatus 3000 may further include a memory 3300. The processor 3100, the communications interface 3200, and the memory 3300 may be connected by using a bus.

It may be understood that the processor 3100 and the memory 3300 may be combined into one processing apparatus, and the processor 3100 is configured to execute program code stored in the memory 3300 to implement the foregoing functions. In specific implementation, the memory 3300 may be integrated into the processor 3100, or may be independent of the processor 3100.

In a possible design, the communications apparatus 3000 may correspond to the first device in the foregoing method embodiments.

Specifically, the communications apparatus 3000 may include a unit configured to perform the method performed by the first device in the method 300 in FIG. 3 and the method 900 in FIG. 9. In addition, the units in the communications apparatus 3000 and the foregoing other operations and/or functions are respectively used to implement the corresponding procedures performed by the first device in the method 300 in FIG. 3 and the method 900 in FIG. 9. It should be understood that a specific process in which the units perform the foregoing corresponding steps has been described in detail in the foregoing method embodiments. For brevity, details are not described herein again.

In a possible design, the communications apparatus 3000 may correspond to the second device in the foregoing method embodiments.

Specifically, the communications apparatus 3000 may include a unit configured to perform the method performed by the second device in the method 300 in FIG. 3 and the method 900 in FIG. 9. In addition, the units in the communications apparatus 800 and the foregoing other operations and/or functions are respectively used to implement the corresponding procedures performed by the second device in the method 300 in FIG. 3 and the method 900 in FIG. 9. It should be understood that a specific process in which the units perform the foregoing corresponding steps has been described in detail in the foregoing method embodiments. For brevity, details are not described herein again.

Figure 14:
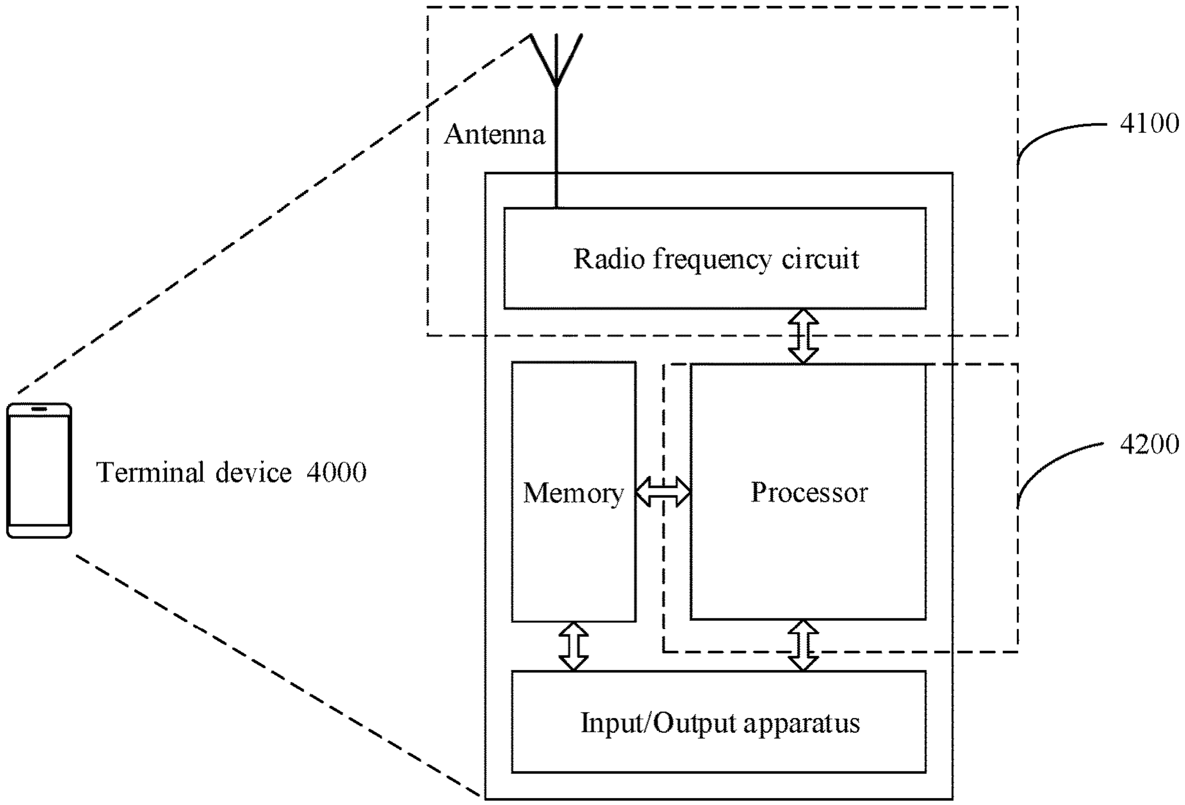
FIG. 14 is a schematic diagram of a structure of a terminal device according to an embodiment of this application.

FIG. 14 is a schematic diagram of a structure of a terminal device 4000 according to an embodiment of this application. The terminal device 4000 may be applied to the system shown in FIG. 1, and perform the function of the terminal device in the foregoing method embodiments. As shown in FIG. 14, an antenna and a radio frequency circuit that have a transceiver function are denoted as a transceiver unit 4100, and a processor that has a processing function is denoted as a processing unit 4200. In other words, the terminal device includes the transceiver unit 4100 and the processing unit 4200. The transceiver unit 4100 may also be referred to as a transceiver, a transceiver machine, a transceiver apparatus, or the like. The processing unit 4200 may also be referred to as a processor, a processing board, a processing module, a processing apparatus, or the like. Optionally, a device that is in the transceiver unit 4100 and that is configured to implement a receiving function may be considered as a receiving unit, and a device that is in the transceiver unit 4100 and that is configured to implement a sending function may be considered as a sending unit. In other words, the transceiver unit 4100 includes the receiving unit and the sending unit. The transceiver unit sometimes may also be referred to as a transceiver machine, a transceiver, a transceiver circuit, or the like. The receiving unit sometimes may also be referred to as a receive machine, a receiver, a receive circuit, or the like. The sending unit sometimes may also be referred to as a transmit machine, a transmitter, a transmit circuit, or the like.

For example, in an implementation, the transceiver unit 4100 is further configured to perform the receiving operations on the side of the terminal device in S1010 to S1030 and S1060 and S1070 shown in FIG. 10, the transceiver unit 4100 is further configured to perform the sending operations on the side of the terminal device in S1040 and S1080 shown in FIG. 10, and/or the transceiver unit 4100 is further configured to perform another sending/receiving step on the side of the terminal device.

For another example, in an implementation, the transceiver unit 4100 is further configured to perform the receiving operations on the side of the terminal device in S1110, S1120, and S1150 shown in FIG. 11, the transceiver unit 4100 is further configured to perform the sending operations on the side of the terminal device in S1140 and S1170 shown in FIG. 11, and/or the transceiver unit 4100 is further configured to perform another sending/receiving step on the side of the terminal device. The processing unit 4200 is configured to perform steps S1130 and S1160 shown in FIG. 11, and/or the processing unit 4200 is further configured to perform another processing step on the side of the terminal device.

It should be understood that FIG. 14 is merely an example instead of a limitation. The terminal device including the transceiver unit and the processing unit may not depend on the structure shown in FIG. 14.

Figure 15:
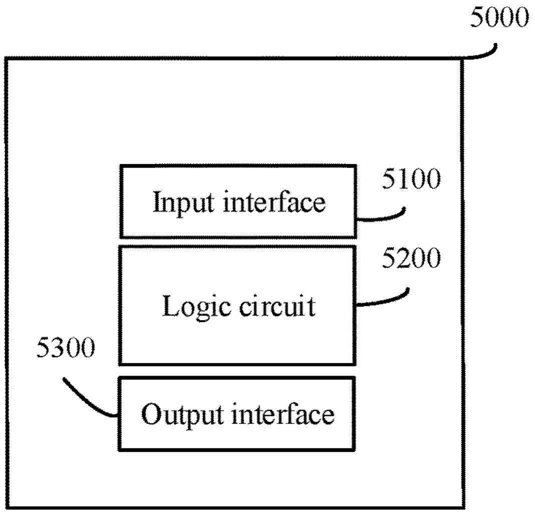
FIG. 15 is a schematic diagram of a structure of an apparatus according to an embodiment of this application.

FIG. 15 shows an apparatus 5000 according to an embodiment of this application. The apparatus 5000 may be configured to perform the method performed by the terminal device or the network device. The apparatus 5000 may be a communications device or a chip in a communications device. As shown in FIG. 15, the apparatus 5000 includes at least one input interface (Input(s)) 5100, a logic circuit 5200, and at least one output interface (Output(s)) 5300. Optionally, the logic circuit 5200 may be a chip or another integrated circuit that can implement the method in this application.

The logic circuit 5200 may implement the method performed by the terminal device or the network device in the foregoing embodiments.

The input interface 5100 is configured to receive data. The output interface 5300 is configured to send data. For example, when the apparatus 5000 is a terminal device, the input interface 5100 may be configured to receive a reference signal sent by a network device, and the input interface 5100 may be further configured to receive an RRC message sent by the network device; and the output interface 5300 may be configured to send CSI to the network device. When the apparatus 5000 is a network device, the output interface 5300 is configured to deliver a reference signal to a terminal device, and the output interface may be further configured to deliver an RRC message to the terminal device; and the input interface 5100 may be configured to receive CSI sent by the terminal device.

For a function of the input interface 5100, the logic circuit 5200, or the output interface 5300, refer to the method performed by the terminal device or the network device in the foregoing embodiments. Details are not described herein.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), or a programmable logic device (programmable logic device, PLD) or another integrated chip.

In an implementation process, the steps in the foregoing methods can be implemented by using a hardware integrated logic circuit in the processor, or by using instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these and any memory of another appropriate type.

According to the method provided in the embodiments of this application, this application further provides a computer program product. The computer program product includes computer program code. When the computer program code is run on a computer, the computer is enabled to perform the methods respectively performed by the first device and the second device in the embodiments shown in FIG. 3 and FIG. 9, or perform the methods respectively performed by the terminal device and the network device in the embodiments shown in FIG. 10 and FIG. 11.

According to the method provided in the embodiments of this application, this application further provides a computer-readable medium. The computer-readable medium stores program code. When the program code is run on a computer, the computer is enabled to perform the methods respectively performed by the first device and the second device in the embodiments shown in FIG. 3 and FIG. 9, or perform the methods respectively performed by the terminal device and the network device in the embodiments shown in FIG. 10 and FIG. 11.

According to the method provided in the embodiments of this application, this application further provides a system. The system includes one or more first devices and one or more second devices. The first device may be a terminal device, and the second device may be a network device. Alternatively, the first device may be a network device, and the second device may be a terminal device.

The network device and the terminal device in the apparatus embodiments fully correspond to the network device or the terminal device in the method embodiments. A corresponding module or unit performs a corresponding step. For example, the communications unit (transceiver) performs a receiving step or a sending step in the method embodiments, and a step other than the sending step or the receiving step may be performed by the processing unit (processor). For a specific function of the unit, refer to the corresponding method embodiments. There may be one or more processors.

Terms such as “component”, “module”, and “system” used in this specification are used to indicate a computer-related entity, hardware, firmware, a combination of hardware and software, software, or software being executed. For example, a component may be, but is not limited to, a process that is run on a processor, a processor, an object, an executable file, an execution thread, a program, and/or a computer. As illustrated by using figures, both a computing device and an application that is run on the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

In the foregoing embodiments, all or some of the functions of the functional units may be implemented by software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state disk (solid-state disk, SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining channel information, comprising:

sending, by a first device, a first reference signal to a second device, wherein a density of the first reference signal is less than or equal to a density of a second reference signal, and the second reference signal is a normal-density reference signal;

receiving, by the first device, first channel state information (CSI) from the second device, wherein when the density of the first reference signal is less than the density of the second reference signal, the first CSI is obtained by the second device based on the first reference signal, and when the density of the first reference signal is equal to the density of the second reference signal, the first CSI is obtained by the second device based on a part of the first reference signal received on a resource used to receive a low-density reference signal;

obtaining, by the first device, second CSI based on the first CSI and a first neural network model deployed on the first device, wherein the second CSI is used to indicate channel information between the first device and the second device; and updating, by the first device, the first neural network model based on a preset trigger condition being met, wherein the preset trigger condition includes that a first timer expires, and the first timer is started when the first device sends the first reference signal to the second device, wherein before the sending, by a first device, a first reference signal to a second device, the method further comprises:

receiving, by the first device, a second request message from the second device, wherein the second request message is used to request the first reference signal, and the second request message is further used to indicate the density of the first reference signal.

2. The method according to claim 1, wherein before the sending, by a first device, a first reference signal to a second device, the method further comprises:

determining, by the first device, the first neural network model, wherein the determining, by the first device, the first neural network model comprises:

sending, by the first device, the second reference signal to the second device;

receiving, by the first device, third CSI from the second device, wherein the third CSI is obtained by the second device based on the second reference signal; and training, by the first device, a neural network based on the third CSI, to obtain the first neural network model.

3. The method according to claim 1, wherein the updating, by the first device, the first neural network model based on the preset trigger condition being met comprises:

sending, by the first device, a third reference signal to the second device, wherein the third reference signal is a normal-density reference signal;

receiving, by the first device, fourth CSI from the second device, wherein the fourth CSI is obtained by the second device based on the third reference signal; and training, by the first device, the neural network based on the fourth CSI, to obtain an updated first neural network model.

4. The method according to claim 3, wherein the preset trigger condition includes that the first device determines that demodulation performance of demodulating first data by the second device is less than a preset threshold, and the first data is sent by the first device based on the second CSI; or the preset trigger condition includes that the first device receives a first request message from the second device, and the first request message is used to request to update the first neural network model.

5. The method according to claim 1, wherein before the sending, by a first device, a first reference signal to a second device, the method further comprises:

sending, by the first device, first indication information to the second device when determining the first neural network training model, wherein the first indication information is used to indicate the density of the first reference signal.

6. The method according to claim 1, wherein based on the first device being a network device, the second request message is carried in uplink control information (UCI); or based on the first device being a terminal device, the second request message is carried in downlink control information (DCI).

7. The method according to claim 5, wherein based on the first device being a network device, the first indication information is carried in downlink control information (DCI); or based on the first device being a terminal device, the first indication information is carried in uplink control information (UCI).

8. The method according to claim 1, wherein when the first device is a network device, the method further comprises:

sending, by the first device, a radio resource control (RRC) message to the second device, wherein the RRC message comprises density configuration information of the first reference signal.

9. The method according to claim 1, wherein when the first device is a terminal device, the method further comprises:

receiving, by the first device, a radio resource control (RRC) message from the second device, wherein the RRC message comprises density configuration information of the first reference signal.

10. The method according to claim 1, wherein when the density of the first reference signal is less than the density of the second reference signal, the density of the first reference signal is ½ or ¼ of the density of the second reference signal.

11. A method for obtaining channel information, comprising:

receiving, by a second device, a first reference signal from a first device, wherein a density of the first reference signal is less than or equal to a density of a second reference signal, and the second reference signal is a normal-density reference signal; and sending, by the second device, first channel state information (CSI) to the first device, wherein the first CSI is used to obtain second CSI using a first neural network model deployed on the first device, the second CSI is used to indicate channel information between the first device and the second device, wherein when the density of the first reference signal is less than the density of the second reference signal, the first CSI is obtained by the second device based on the first reference signal, and when the density of the first reference signal is equal to the density of the second reference signal, the first CSI is obtained by the second device based on a part of the first reference signal received on a resource used to receive a low-density reference signal, wherein the first neural network model is updated by the first device based on a preset trigger condition being met, wherein the preset trigger condition includes that a first timer expires, and the first timer is started when the first device sends the first reference signal, wherein before the receiving, by a second device, a first reference signal from a first device, the method further comprises:

sending, by the second device, a second request message to the first device, wherein the second request message is used to request the first reference signal, and the second request message is further used to indicate the density of the first reference signal.

12. The method according to claim 11, wherein before the receiving, by a second device, a first reference signal from a first device, the method further comprises:

receiving, by the second device, the second reference signal from the first device; and sending, by the second device, third CSI to the first device, wherein the third CSI is obtained based on the second reference signal, and the third CSI is used to train a neural network to obtain the first neural network model.

13. The method according to claim 11, wherein the method further comprises:

receiving, by the second device, a third reference signal from the first device, wherein the third reference signal is a normal-density reference signal; and sending, by the second device, fourth CSI to the first device, wherein the fourth CSI is obtained based on the third reference signal, and the fourth CSI is used to train the neural network to obtain an updated first neural network model.

14. The method according to claim 11, wherein the sending, by the second device, a second request message to the first device comprises:

periodically sending, by the second device, the second request message to the first device; or sending, by the second device, the second request message to the first device based on receiving second indication information from the first device, wherein the second indication information is used to indicate that the first neural network model is determined.

15. The method according to claim 11, wherein before the receiving, by a second device, a first reference signal from a first device, the method further comprises:

receiving, by the second device, first indication information from the first device, wherein the first indication information is used to indicate the density of the first reference signal.

16. The method according to claim 11, wherein based on the second device being a terminal device, the second request message is carried in uplink control information (UCI); or based on the second device being a network device, the second request message is carried in downlink control information (DCI).

17. The method according to claim 15, wherein based on the second device being a terminal device, the first indication information is carried in downlink control information (DCI); or based on the second device being a network device, the first indication information is carried in uplink control information (UCI).

18. A communications apparatus, comprising a transceiver unit and a processor, wherein the communications apparatus is a first device in a network and wherein the transceiver unit is configured to send a first reference signal to a second device, wherein a density of the first reference signal is less than or equal to a density of a second reference signal, and the second reference signal is a normal-density reference signal;

the transceiver unit is further configured to receive first channel state information (CSI) from the second device, wherein when the density of the first reference signal is less than the density of the second reference signal, the first CSI is obtained by the second device based on the first reference signal, and when the density of the first reference signal is equal to the density of the second reference signal, the first CSI is obtained by the second device based on a part of the first reference signal received on a resource used to receive a low-density reference signal; and the processor is configured to obtain second CSI based on the first CSI and a first neural network model deployed on the apparatus, wherein the second CSI is used to indicate channel information between the communications apparatus and the second device; and the processor is configured to update the first neural network model based on a preset trigger condition being met, wherein the preset trigger condition includes that a first timer expires, and the first timer is started when the transceiver unit sends the first reference signal to the second device, wherein the transceiver is further configured to, before sending the first reference signal to the second device, receive a second request message from the second device, wherein the second request message is used to request the first reference signal, and the second request message is further used to indicate the density of the first reference signal.

* * * * *